US012624210B2

(12) United States Patent
Bruns et al.

(10) Patent No.: US 12,624,210 B2
(45) Date of Patent: May 12, 2026

(54) SYSTEM AND METHOD FOR GENERATING TIRE RUBBER ASPHALT

(71) Applicant: ASPHALT SCIENCES LLC, Reno, NV (US)

(72) Inventors: Joseph Randall Bruns, Reno, NV (US); Hashem Hashemi, Reno, NV (US)

(73) Assignee: Asphalt Sciences LLC, Reno, NV (US)

( * ) Notice: Subject to any disclaimer, the term of this patent is extended or adjusted under 35 U.S.C. 154(b) by 692 days.

(21) Appl. No.: 17/959,224

(22) Filed: Oct. 3, 2022

(65) Prior Publication Data

US 2023/0085865 A1     Mar. 23, 2023

Related U.S. Application Data

(63) Continuation-in-part of application No. 17/086,948, filed on Nov. 2, 2020, now Pat. No. 11,459,274, which is a continuation of application No. 16/255,804, filed on Jan. 23, 2019, now Pat. No. 10,843,966, which is a continuation-in-part of application No. 15/283,821, filed on Oct. 3, 2016, now Pat. No. 10,214,617.

(60) Provisional application No. 62/661,609, filed on Apr. 23, 2018, provisional application No. 62/236,861, filed on Oct. 3, 2015.

(51) Int. Cl.
| | |
|---|---|
| *C08L 95/00* | (2006.01) |
| *C04B 18/22* | (2006.01) |
| *C08J 11/08* | (2006.01) |

(52) U.S. Cl.
CPC .............. *C08L 95/00* (2013.01); *C04B 18/22* (2013.01); *C08J 11/08* (2013.01); *C08J 2321/00* (2013.01)

(58) Field of Classification Search
CPC .... C08L 95/00; C08L 95/005; C08L 2555/80; C08L 2555/82; C08L 2555/84; C08L 2555/86; C08L 2555/34
See application file for complete search history.

(56) References Cited

U.S. PATENT DOCUMENTS

| | | | |
|---|---|---|---|
| 4,068,023 | A | 1/1978 | Nielsen et al. |
| 4,085,078 | A | 4/1978 | McDonald |
| 4,609,696 | A | 9/1986 | Wilkes |
| 5,334,641 | A | 8/1994 | Rouse |
| 5,397,818 | A | 3/1995 | Flanigan |
| 5,491,401 | A | 2/1996 | Inoue et al. |
| 5,492,561 | A | 2/1996 | Flanigan |
| 5,683,498 | A | 11/1997 | Hesp |
| 7,074,846 | B2 | 7/2006 | Sylvester et al. |
| 9,540,512 | B2 | 1/2017 | Flanigan |
| 9,803,085 | B2 | 10/2017 | Flanigan |
| 10,214,617 | B1 | 2/2019 | Bruns et al. |
| 10,233,120 | B2 | 3/2019 | Flanigan |
| 2001/0028571 | A1 | 10/2001 | Hanada et al. |
| 2009/0105376 | A1 | 4/2009 | Korenstra et al. |
| 2011/0196074 | A1* | 8/2011 | Flanigan ................ B28C 7/003 366/16 |
| 2013/0088278 | A1 | 4/2013 | Spalding, Jr. et al. |
| 2014/0261076 | A1 | 9/2014 | Quinn et al. |
| 2016/0272778 | A1 | 9/2016 | Yuan |
| 2017/0267864 | A1 | 9/2017 | Flanigan |

FOREIGN PATENT DOCUMENTS

| | | |
|---|---|---|
| EP | 2852018 A2 | 3/2015 |
| KR | 101239399 B1 | 3/2013 |
| WO | 2008088755 A2 | 7/2008 |
| WO | 2019209400 A1 | 10/2019 |

OTHER PUBLICATIONS

Chivata, D et al., Conceptual Design of a Plant for the Exploitation of Ground Rubber of Used Tires from Pyrolysis, Date: Feb. 2018, p. 33, 89, University of America, Bogota Colombia.

* cited by examiner

*Primary Examiner* — Christopher M Rodd
(74) *Attorney, Agent, or Firm* — Kerr IP Group LLC

(57) ABSTRACT

A method and system for generating a rapid digestion process ("RDP") product are described. The method includes receiving a bitumen compound and first heating the bitumen compound to 320° F. to 420° F. The method then proceeds to add tire rubber to the bitumen compound. The bitumen compound and the tire rubber are mixed for 5 minutes to 360 minutes during a second heating to 525° F. to 700° F. Further, sulfur is added to the mixture of tire rubber and bitumen compound. These steps generate the RDP product. The RDP product is then cooled for transfer to a storage vessel.

10 Claims, 6 Drawing Sheets

SYSTEM AND METHOD FOR GENERATING TIRE RUBBER ASPHALT

CROSS REFERENCE

This patent application is a continuation-in-part of utility patent application Ser. No. 17/086,948, filed on Nov. 2, 2020, entitled SYSTEM AND METHOD FOR GENERATING TIRE RUBBER ASPHALT, which is a continuation of utility patent application Ser. No. 16/255,804, filed on Jan. 23, 2019 (now U.S. Pat. No. 10,843,966), entitled SYSTEM AND METHOD FOR GENERATING TIRE RUBBER ASPHALT, which claims the benefit of provisional patent application 62/661,609 entitled SYSTEM AND METHOD OF DISSOLVING TIRE RUBBER filed on Apr. 23, 2018 and is a continuation-in-part of utility patent application Ser. No. 15/283,821, filed Oct. 3, 2016 (now U.S. Pat. No. 10,214,617), entitled DISSOLVING TIRE RUBBER, which claims the benefit of provisional patent application no. 62/236,861, entitled DISSOLVING TIRE RUBBER filed on Oct. 3, 2015; all of which patent applications are incorporated by reference in this patent application.

FIELD

This invention relates to a composition, system, and method for generating a tire rubber bitumen. More specifically, the invention relates to a composition, systems, and methods for dissolving tire rubber in bitumen or oil by heating the mixture.

BACKGROUND

Bitumens have been modified with rubber and elastomers to improve the properties of the resulting composition. For example, in Trumbore, U.S. Pat. No. 5,342,866, teaches an elastomeric-bitumen composition with improved low temperature performance and reduced resistance to flow at high temperatures. The Trumbore asphalt incorporates SBS and SIS block copolymers as the elastomeric compounds, but does not phase separate and is compatible to production at high temperatures up to 475° F. (246° C.). While Nielsen, U.S. Pat. No. 4,068,023, teaches one of the earliest examples showing the incorporation of reclaimed rubber into asphalt for paving using elevated temperatures up to 450° F. (232° C.) with an admixture of aromatic oils.

Each year the U.S. generates approximately 290 million scrap tires. About 12 million scrap tires are converted into ground tire rubber ("GTR") or crumb rubber for modifying asphalt cements. Asphalt bitumen is a mixture of relatively high molecular weight compounds that do not distill off of petroleum in a refinery and include practically no polymers. In contrast, the major component of tire rubbers are cross-linked polymers. The utilization of scrap tire rubber in asphalt bitumen started in the mid-1960's when GTR was placed in asphalt bitumen surface treatments, such as chip seal applications.

Martin, EP1877493, teaches a modified asphalt binder composition that includes about 40% by weight to about 98.9% by weight asphalt binder material, about 0.5% by weight to about 25% by weight crumb rubber, about 0.5% by weight to about 30% by weight of at least one synthetic polymer, and about 0.05% by weight to about 5% by weight of at least one acid. Martin also teaches a method for making a modified asphalt binder composition that includes providing neat asphalt, heating the neat asphalt to a temperature of between about 120° C. (248° F.) and about 200° C. (392° F.), adding modifying ingredients to the neat asphalt sequentially with mixing for period of between about 5 minutes and about 10 hours each, and agitating the with a low shear mixer or a high shear mixer for an additional period of between about 5 minutes and about 48 hours.

Davis, U.S. Pat. No. 10,457,602, teaches asphalt formulations and methods of preparation suitable for roofing products that incorporate elastomers, post-consumer recycled olefinic polymers, and 10-80 mesh GTR. However, the inclusion of olefinic polymers, and especially polypropylene, disadvantageously decreases the impact resistance performance of asphalt shingle roof coatings. In all the disclosed formulations Davis limits the incorporation of GTR to 20% or less by weight and the incorporation of polymer elastomers to 18% or less by weight. Further, Davis limits the disclosed methods of preparation to mixing temperatures below 425° F. (218° C.).

In terms of environmental concerns, the disposal of scrap tires is a major waste management issue. While these environmental concerns are important, there are various challenges associated with using GTR and other forms of scrap tire rubber.

An initial challenge encountered with the use of GTR or crumb rubber is their respective production. Both crumb rubber and GTR, such as ASTM Standards D5603 and 5644, are commonly prepared by removing steel belts, bead wire, and various incorporated fabric plies from scrap tires. Entire processing facilities are required for removal of steel belts, bead wire and other byproducts incorporated into the scrap tires.

For another example, with respect to hot applied chip seal, the inconsistent dissolution of GTR and other forms of scrap tire rubber in asphalt bitumen can result in blockages to hot asphalt spray systems that apply the GTR/asphalt mixture. With respect to asphalt emulsions, the inconsistent dissolution of tire rubber in asphalt bitumen can interfere with the emulsification of asphalt in water due to the interference of the discrete undissolved rubber particles in the asphalt water inversion process. With respect to asphalt cutback, inconsistent dissolution of tire rubber in asphalt bitumen can result in blockages in cold asphalt bitumen spray systems used to apply the tire rubber solvent cut back asphalt to the road surface when used in gravel chip seals. With respect to tack coats, inconsistent dissolution of tire rubber in asphalt bitumen can interfere with even distribution and blockages in the spray applicator that may ultimately result in inferior pavement systems due to improper layer adhesion. With respect to pavement membranes, inconsistent dissolution of tire rubber in asphalt bitumen can interfere with even distribution and blockages in the spray applicator that may ultimately result in inferior pavement systems due to improper adhesion between the reinforcements and the pavement layers. With respect to pavement joint and caulking fillers, inconsistent dissolution of tire rubber in asphalt bitumen used in caulking formulations can interfere with even distribution and blockages in various applicators that may ultimately result in inferior sealing for pavement joints shortened road longevity. With respect to driveway sealers, inconsistent dissolution of tire rubber in asphalt bitumen used in driveway seal formulations can interfere with even distribution and sealing of the drive surface resulting in reduced protection.

Flanigan, U.S. Pat. No. 5,492,561, teaches incorporating the whole tire rubber into the asphalt medium by simulating a "boiling action" in the asphalt medium which allows the tire rubber to be absorbed into the asphalt medium at about 500° F. Flanigan states that below 485° F.-490° F. provides insufficient blending, while above 510° F. the temperature is too close to the flash point of the liquid. According to Flanigan, a temperature of about 500° F. is the safest temperature to use that is high enough to provide full incorporation of whole tire rubber granules into the asphalt medium but not so high that the process becomes unsafe. The Flanigan process produces a dissolved GTR after extended blending of 5-10 hours at 500° F., which degrades the asphalt blend by initiating an extended oxidation reaction that affects the quality of the asphalt. Additionally, Flanigan only generically considers the addition of elastomeric polymers to the asphalt/GTR blend without providing any instruction as to the type, amount, or in situ chemistry of those elastomeric polymer additives.

Coe, W.O. 2019/028286, teaches methods of substituting interlinks of elastomers in vulcanized end of life ("EOL") tire crumb rubber particles in order to allow the recombination of the EOL tire crumb rubber particles such that individual, complex, heterogeneous, cross linked moieties are re-entangled into a monolithic structure with uniform mechanical properties comparable to those of the rubber matrix prior to granulation. This re-entanglement required the destruction of the weakest existing crosslinks in recycled vulcanized rubber allowed for greatly increased value of the end product, which could be used in the production of a variety of products including new tires. However, re-entanglement arises from depolymerization and repolymerization processes that require a specialized reactor vessel, certain additives that catalyze and/or facilitate the depolymerization and repolymerization reactions, and subjection of the rubber/asphalt slurry to a water-based emulsion.

Rached, U.S. Pat. No. 6,713,540, teaches that Sulfur crosslinking in combination with Styrene-Butadiene rubber ("SBR") and Styrene-Butadiene-Styrene (SBS) block copolymer produce a small to medium improvement in physical properties (particularly softening point and penetration), especially at low temperatures. Crosslinking agents modify the macroscopic properties at low temperatures, making the asphalt more elastic, softer, easier to deform, and recover more readily from applied stress, while at the same time providing better resistance to deformation and recovery at high temperature as well. However, Rached limited the temperature range in which Sulfur, crosslink co-agent, or crosslinking accelerator is added to asphalt to between 250° F. and 320° F., even after heating the asphalt initially up to a maximum temperature of 430° F.

Therefore, there exists a need for an improved high temperature asphalt production method incorporating tire rubber into asphalt bitumen products yielding tire rubber bitumen compositions.

SUMMARY

A system and method for generating a modified dissolved tire rubber bitumen rapid digestion process ("RDP") product are described. The method includes receiving a bitumen compound, heating the bitumen compound to 320° F. to 420° F., adding a tire rubber to the bitumen compound, and mixing the bitumen compound and tire rubber to generate a first processed tire rubber bitumen compound. The first processed tire rubber bitumen compound is mixed for 5 minutes to 360 minutes and subjected to a second heating where it is heated to 525° F. to 700° F. during mixing to generate a dissolved tire rubber bitumen compound. Sulfur is added to the dissolved tire rubber bitumen compound. These steps culminate in the generation of the modified dissolved tire rubber bitumen compound or "modified RDP product" from the mixture of the rubber, the bitumen compound, and the sulfur. The modified RDP product is then cooled.

In one embodiment, the method of generating the modified RDP product further includes applying a neutral gas when generating the modified RDP product.

In a further embodiment, the modified RDP product is cooled to 500° F. to 350° F.

In a still further embodiment, the method further includes separating the modified RDP product from a metallic alloy.

In another embodiment, the asphalt compound has a penetration of 0 dmm to 200 dmm.

In yet another embodiment, the method includes receiving the asphalt compound and the tire rubber in a reaction vessel that is first heated to 320° F. to 420° F. Then, the RDP product is generated in the reaction vessel that is subjected to second heating from 525° F. to 700° F.

In still another embodiment, one of the rubber, the bitumen compound, the dissolved tire rubber bitumen compound, and any combination thereof is cross-linked with the sulfur to generate the modified tire rubber bitumen compound.

In a further embodiment, there is little or no oxidation of the bitumen compound, the tire rubber, the RDP product, or the modified RDP product during the steps of the method.

In another embodiment, volatile organic compounds ("VOCs") are generated and the sulfur cross-links at least one of the generated VOCs.

In still another embodiment, a vacuum is applied when generating the modified RDP product.

Additionally, a system for generating a rapid digestion process ("RDP") product is described. The system includes a reaction vessel, a temperature controller, an agitator, a compressor, and a vacuum. The reaction vessel has an exterior surface and an interior space that receives a bitumen compound and a tire rubber compound. The reaction vessel can be sealed, and the temperature controller first heats the bitumen compound and the rubber to a temperature between 320° F. and 420° F. to generate a first processed tire rubber bitumen compound. The temperature controller then proceeds to heat the first processed tire rubber bitumen compound to 525° F. to 700° F. for 5 minutes to 360 minutes to generate the dissolved tire rubber bitumen compound. The agitator is located within the interior reactor space and mixes the bitumen compound, the tire rubber, the first processed tire rubber bitumen compound, and the RDP product during heating. The compressor supplies a neutral gas to the interior reactor space, and the vacuum removes oxygen and other gases from the interior reactor space.

FIGURES

The present invention will be more fully understood by reference to the following drawings which are presented for illustrative, not limiting, purposes.

DESCRIPTION

Figure 1A:
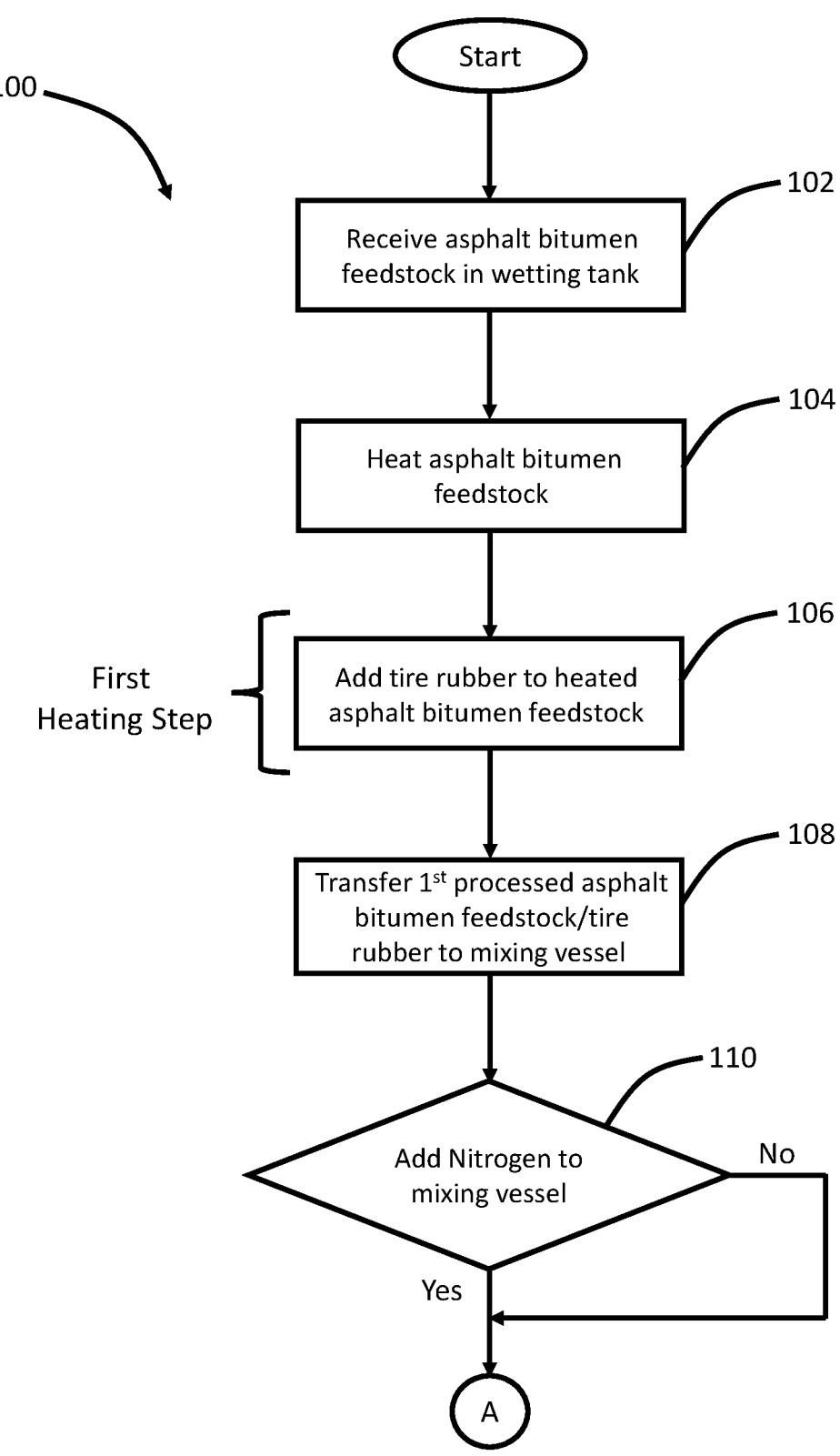
FIGS. 1A and 1B show a flow chart of a method for generating a dissolved rubber compound from tire rubber and an asphalt feedstock.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the methods and compositions described herein may vary as to configuration and as to details. Additionally, the methods may vary as to details, order of the actions, or other variations without departing from the illustrative methods disclosed herein.

The inventors present systems and methods of dissolving tire rubber into bitumen at advantageously high temperatures that enable quick and complete dissolution of a variety of types of tire rubber ranging from highly processed ground tire rubber ("GTR") to unprocessed whole scrap tires. These methods are known collectively as Rapid Digestion Processes ("RDP") that produce dissolved rubber bitumen compounds comprising less than 1% rubber by weight and up to 70% rubber by weight. These dissolved rubber bitumen compounds may also be termed RDP products.

The inventors hypothesize that the RDP systems and methods presented herein release oils, carbon black, and other organic compounds from the vulcanized rubber, which enhances the maltene fraction of the resulting tire rubber bitumen compound. These released oils improve the pliability of the bitumen binder. The release of carbon black improves the weathering resistance because the bitumen can retain its dark color. Also, the release of the carbon black results in a deep black bitumen coloration that maintains a high contrast marking surface longer than conventional bitumen binders. However, some of the released oils and organic compounds may disadvantageously lower the flash point and increase the mass loss of the resulting dissolved rubber bitumen compound, requiring further processing to yield a safe and stable material, as further disclosed herein.

Processes such as Flanigan (described above) teach heating to a temperature of 485° F. to 510° F. and requires high shear mixing for 5 to 10 hours to reduce the particle size of the rubber so that a solubility of better than 90% is achieved. However, the Flanigan process fails to improve the material performance because no significant increase in penetration at 77° F. is observed over the original bitumen. The inventors hypothesize that the exposure of the vulcanized rubber at this lower temperature fails to completely release the process oils from GTR or scrap tire rubber and, further, due to the extended exposure of the mixture to heat and oxygen, the bitumen is degraded by oxidation and a reduction of the bitumen maltene fraction. Furthermore, the Flanigan process shows an increase in the carbonyls and sulfoxides that have been reported as indicators of accelerated aging. Thus, there are various limitations of Flanigan that are overcome by the systems, methods and compositions presented herein.

Many polymers, such as unmodified tire rubber will slowly depolymerize in the presence of ozone, sun light, and high temperature spots caused by heavy traffic. Thus, the addition of unmodified tire rubber to asphalt can offer a low quality product that is not usually suitable for use as a road paving product. Depolymerization of rubber mixed into asphalt leads to cracks and other weaknesses in the asphalt product that are susceptible to water damage from freeze thaw cycles.

The systems, methods and compositions presented may be applied to asphalt road paving, asphalt bridge coating, hot mix asphalt, warm mix asphalt, cold mix asphalt, hot applied chip seal, applied emulsions, asphalt cutback, tack coats, pavement membranes, fog seal, bond coating, crack fillers, seal coats, thin overlay binders, microsurfacing, pavement joint and caulking fillers and driveway fillers. In some embodiments, the systems, methods and compositions presented may be applied to roofing flux, roofing coatings, polymer modified roofing compounds, peel and stick compounds, waterproofing applications, pipe metal, concrete, and other coatings. The systems and methods presented herein overcome the challenges associated with undissolved rubber or inconsistently dissolved rubber in bitumen, and particularly undissolved scrap tire rubber.

With respect to hot and cold applied chip seal, the systems, methods and compositions drastically reduce spray blockages during hot chip seal application. Additionally, the uniformity and consistent viscosity results in a more even bitumen application and improved adhesion of the gravel chip seal to the road surface.

With respect to asphalt emulsions, the systems, methods and compositions presented herein result in a high solubility of the tire rubber, which allows for a uniform dispersion of a consistent viscosity bitumen that is easily emulsified in anionic, cationic, and non-ionic emulsion technologies.

The systems, methods and compositions combine tire rubber and bitumen at a high temperature to produce an improved bitumen mixture referred to as a tire rubber bitumen compound. The "tire rubber" used to produce the tire rubber bitumen compound may include, by way of example and not of limitation, GTR, scrap tire rubber, whole tires, other such tire rubber, and any combination thereof.

Additionally, the systems, methods and compositions presented herein provide a better than 99% dissolution of tire rubber in bitumen that drastically reduces spray blockages. Additionally, the systems, methods and compositions provide uniform and consistent viscosity results, which provides improved adhesion. Furthermore, the dark coloration from the carbon black in the tire rubber results in a uniform black surface with improved weather capabilities. Further still, the oils released from the tire rubber improve the tack and adhesion properties of the resulting tire rubber bitumen compound, providing a stronger bond to surfaces, e.g. a driveway surface.

While depolymerization of the rubber added to the bitumen and oil compounds described herein is beneficial, pyrolization is detrimental. When rubber is exposed to too high a temperature for too long the rubber degrades and produces a complicated rubber and asphalt or rubber and oil mixture comprising many highly volatile compounds that may be useful as a fuel but not as an asphalt/oil product and exhibiting a viscosity lower than desired in a workable asphalt/oil product. Further, the resulting fuel product contains significant quantities of Sulfur compounds that must be removed. The maximum reported degradation rates for rubber occur above 700° F.

In contrast, process temperatures that are too low do not result in sufficient depolymerization. The inventors hypothesize that below 525° F. very limited depolymerization occurs, and instead rubber is simply devulcanized or de-cross-linked. And to accomplish the requisite level of depolymerization at temperatures below 525° F. would require too long too expensive a process, such as requiring expensive shear or elevated pressure, for practical industrial process scales.

The systems, methods and compositions presented herein may be applied to asphalt cutback, pavement membranes, tack coats, pavement joint and caulking fillers driveway sealer, roofing flux, roofing coatings, polymer modified roofing compounds, peel and stick compounds, waterproofing applications, pipe metal, concrete, and other coatings. Asphalt tack coats (hot applied, solvent, and emulsion based) are used to improve the adhesion between layers of asphalt pavement.

The systems, methods, and compositions presented herein may be applied to asphalt road paving as a "binder." The term binder is defined more clearly in the compositions section below.

The term "asphalt" is defined by the American Society for Testing and Material (ASTM) as a dark brown to black cementitious material solid or semi solid in consistency, in which the predominating constituents are bitumens which occur in nature as such or are obtained in residue in refining petroleum. More generally, the present compositions and methods described herein consider asphalt a colloidal system composed primarily of bitumen and aggregate.

The term "bitumen" refers to a generic term that according to the ASTM relates to a mixture of hydrocarbons of natural or pyrogenous origin, or a combination of both, frequently accompanied by their non-metallic derivates, which may be gaseous, liquid, semisolid, or solid and which are completely soluble in carbon disulphide. In commercial practice the term bitumen is used for the semisolid or solid bitumen which includes tars and pitches. Tars and pitches are obtained by destructive heat action on crude oil, coal and other organic materials. For the purposes of this disclosure, bitumen is understood to be composed of asphaltenes and maltenes, in contrast to some industry terminology that identifies asphalt as being composed of asphaltenes and maltenes. The relative amounts of asphaltenes and maltenes in the bitumen determine the physical and chemical behavior of any given asphalt derived therefrom.

The term "asphaltene(s)" refers to the portion of bitumen that is naphtha insoluble, so that in an excess of naphtha the asphaltenes remain insoluble. The asphaltenes may represent up to 50% of bitumen, in which a major portion of total Oxygen, Nitrogen, Sulfur, Nickel and Vanadium are concentrated. Asphaltenes are brown to black amorphous solids. Asphaltenes have carbon/hydrogen ratios of 0.81-1.00 which indicates they are aromatic in nature. Their molecular weight ranges from 500-7000 Daltons ("Da").

The term "maltene" refers to the naphtha soluble portion of bitumen. The maltene fraction is free of asphaltenes and carbenes. The maltene carbon/hydrogen ratio is in the range of 0.6-0.75 which indicates that the molecular structure includes aliphatic chains or saturated rings. The maltene fraction includes resins and oils. The molecular weights are in the range of 500-1500 Da.

The term "resins" refers to cyclic aromatic compounds.

The term "oils" refers to saturated hydrocarbons having appreciable wax content.

The term "carbenes" refers to the highest carbon content fraction of bitumen. Carbenes are insoluble in carbon tetrachloride. Carbenes, if present, occur in trace amounts.

The term "asphalt feedstock" is used interchangeably with the term "bitumen" "asphalt bitumen," "asphalt bitumen feedstock," and/or oil starting materials.

The term "penetration" refers to the depth a standard steel needle with a truncated cone penetrates a properly prepared sample of bitumen. Penetration is related to hardness or consistency of the bitumen or any asphalt derived therefrom. The apparatus which permits the needle holder to move vertically without fraction and measures the depth of penetration to the nearest 0.1 mm is known as penetrometer. The distance that the needle penetrates in units of tenths of a millimeter is the penetration value. The weight of the needle is 50 g and another 50 g weight is placed on the needle, which results in a 100 g weight. The needle is slowly lowered onto a sample until it just makes contact with the surface of the sample. The dial of the penetrometer is adjusted to zero and the needle is released quickly for the specified period of five seconds and the distance penetrated is measured to the tenth of a millimeter.

The term "softening point" refers to a measure of temperature in which a steel ball passes through a ring that includes the bitumen sample and falls a distance of 2.54 cm, when the specimen, ball and bath of water/glycerin are heating at a specified rate. A steel ball, 9.54 mm in diameter, is placed in each ball centering guide.

The term "viscosity" refers to the viscosity determination of bitumen or any asphalt derived therefrom at elevated temperatures using a rotational viscometer as described in ASTM D4402, which is hereby incorporated by reference.

The term "mass loss" refers to the amount of volatile compounds that escape a bitumen or asphalt composition derived therefrom over time. Mass loss is measured as the percent of the initial mass lost, i.e. $m_i = 100 \times (m_i - m_f)/m_i$, where "$m_i$" is the mass loss, "$m_i$" is the initial mass, and "$m_f$" is the mass after a measurement time. This metric is useful for simulating asphalt binder aging, and is standardized under AASHTO T240 and ASTM D2872, which describe a rolling thin film oven procedure for exposing asphalt binders to high temperatures to simulate binder aging.

The term "volatile organic compound" ("VOC") refers to a broad group of non-methane hydrocarbons that encompass organic chemicals having a high vapor pressure at room temperature, i.e., a low boiling point. With respect to bitumen (or asphalt) VOC emission, VOCs are typically petroleum derived and can include, but are not limited to, acetone, ethanol, trimethylbenzene, toluene, butanone, isopropyl alcohol, benzene, dichloromethane, ethylacetate, heptane, ethylbenzene, xylene, benzo pyrene, anthracene, naphthalene, acridines, pyridines, and phenols.

The term "Styrenic Block Copolymer" or "SBC" refers to a large category of thermoplastic elastomers. SBCs possess the mechanical properties of rubbers, and the processing characteristics of thermoplastics. There are two broad classes of SBCs contemplated by this application: saturated and unsaturated. The saturated SBCs have a saturated alkyl backbone linking the styrenic blocks together, while the unsaturated SBCs have an unsaturated or poly-unsaturated backbone linking the styrenic blocks together. There are six major types of SBCs contemplated by this application, Styrene-Butadiene ("SB"), Styrene-Butadiene-Styrene ("SBS") block polymers, Styrene-isoprene-styrene ("SIS") block copolymers, Styrene-Ethylene copolymers ("SEC"), Styrene-Ethylene-Butylene-Styrene ("SEBS"), and hydrogenated styrenic block copolymers ("HSBC"). SB, SBS, and SIS are unsaturated, containing at least one Carbon-Carbon double bond ("C=C"). The HSBCs, SEC, and SEBS are saturated, having a saturated alkyl backbone linking the styrenic blocks together that lacks any C=C bonds, or Carbon-Carbon triple bonds, instead containing only C—C bonds and Carbon-Hydrogen bonds ("C—H"). In some embodiments, the SBS is radial.

The SBCs can be branched, linear, diblock, triblock, tetrablock, or multiblock. In some embodiments, the SBC has the general formulae S—B—S (I), or $(S-B)_n$—X (II), and may contain varying amounts of diblock S—B (III) up to 100%. In these formulae, each S independently is a poly(vinyl aromatic), and each B independently is: (1) a saturated alkyl chain or cycloalkyl block, (2) an unsaturated alkylene or cycloalkylene block, or (3) an unsaturated alkyne or cycloalkyne block, n is an integer equal to or greater than 2, and X is the residue of a coupling agent, where the coupling agent can be any di- or polyfunctional coupling agent known in the art.

An exemplary vinyl aromatic monomer is styrene. In some embodiments, the styrene moiety forming the SBCs are substantially pure monomers or a major component in mixtures with minor proportions of other structurally related vinyl aromatic monomer(s), such as o-methylstyrene, p-methylstyrene, p-tert-butylstyrene, 2,4-dimethylstyrene, α-methylstyrene, vinylnaphtalene, vinyltoluene and vinylxylene. Similarly, in some embodiments, the alkyl, cycloalkyl, alkylene, cycloalkylene, alkyne, or cycloalkyne moiety forming the SBC are substantially pure monomers or can contain minor proportions of structurally related alkyls, cycloalkyls, alkylenes, cycloalkylenes, alkynes, or cycloalkynes.

In one embodiment, the unsaturated SBCs comprise at least two polymer blocks. At least one of those at least two polymer blocks is substantially made of an aromatic vinyl compound and at least one other of the at least two polymer blocks is substantially made of a conjugated diene compound.

In another embodiment, the saturated SBCs comprise three polymer blocks. One of those polymer blocks is substantially made of an aromatic vinyl compound, one other of the polymer blocks is substantially made of a monoene chain compound, and another of the polymer blocks is substantially made of a second monoene chain compound.

The term "neutral gas" refers to non-reactive gases or non-oxygenated gases, such as, but not limited to, argon (Ar), carbon dioxide ($CO_2$), helium (He), neon (Ne), and nitrogen ($N_2$).

Method for Dissolving Tire Rubber

Figure 1B:
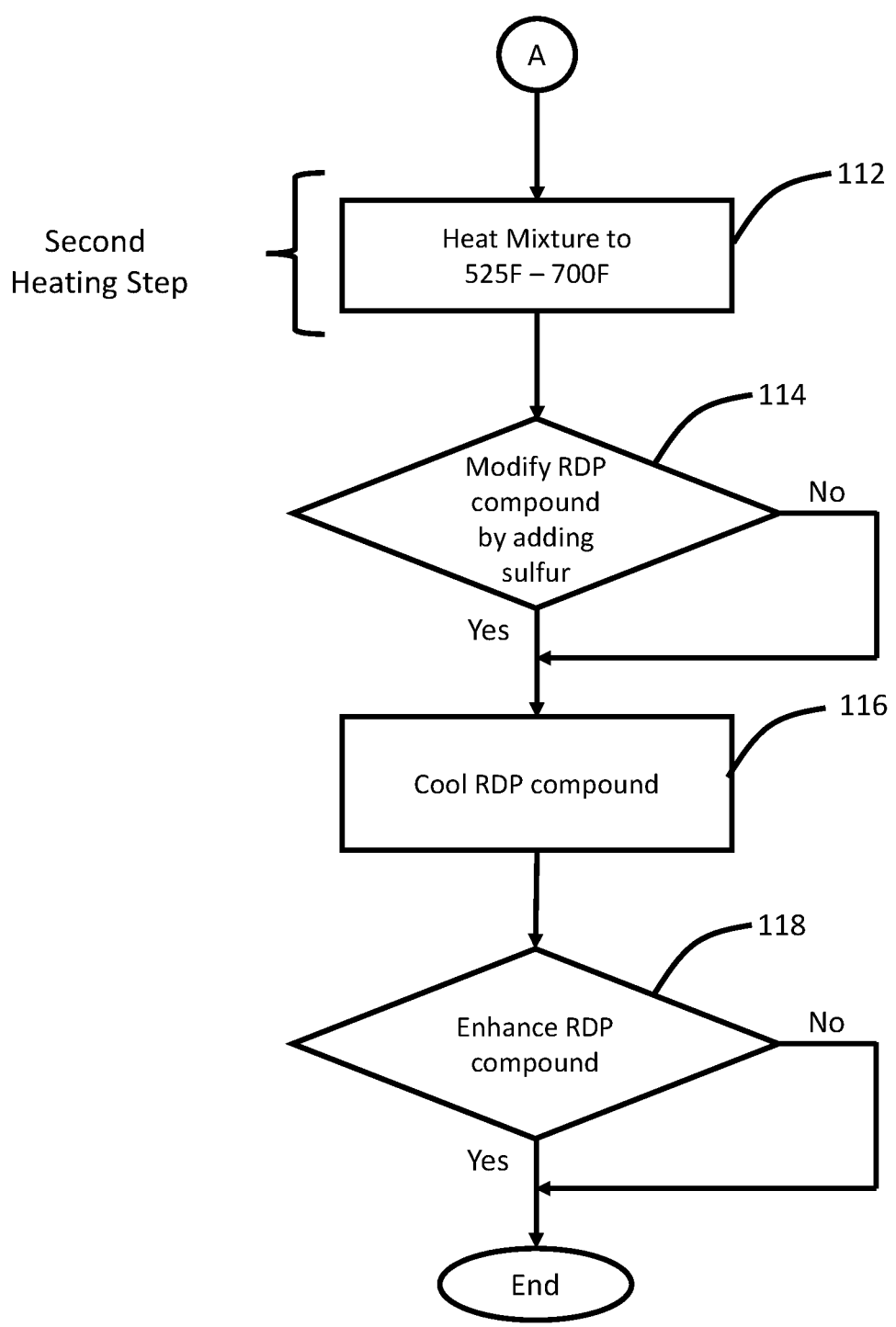

Referring to FIGS. 1A and 1B, there is shown an illustrative method 100 for dissolving tire rubber in bitumen, known generally as the rapid digestion process ("RDP"). The RDP method presented herein includes exposing the tire rubber to temperatures exceeding 525° F. for periods of 6 hours or less causing the tire rubber to release process oils embedded within the tire rubber into the bitumen.

Figure 3:
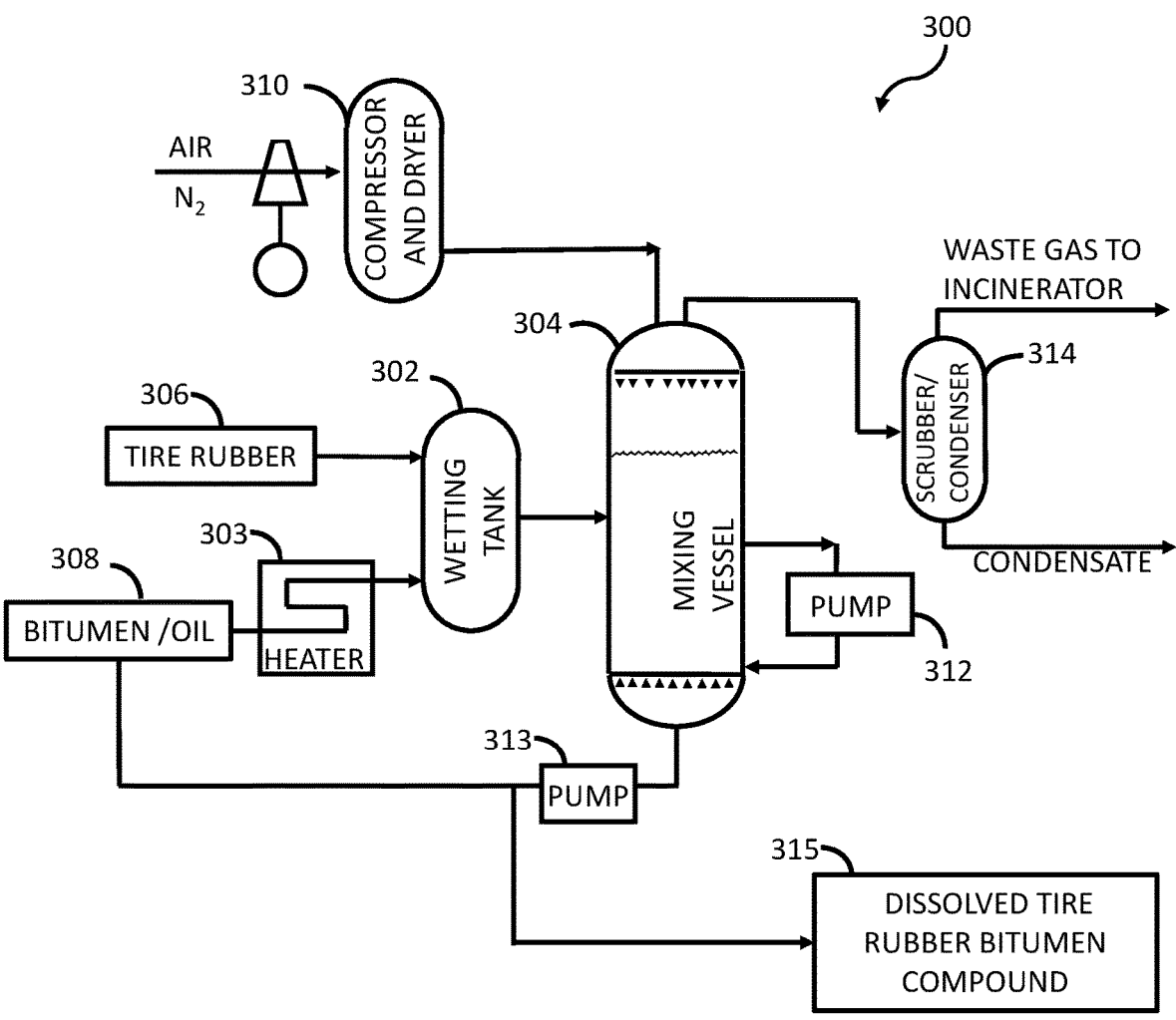
FIG. 3 shows an illustrative reaction system.

The method is initiated at block 102 where an appropriate asphalt feedstock is selected and received in a wetting tank (shown in FIG. 3 as reference 302). By way of example and not of limitation, the illustrative asphalt feedstock has a penetration of 135 dmm @77° F. In an alternative embodiment, an oil compound may be substituted for the asphalt feedstock. Note, the method 100 may use only asphalt feedstock, only oil, or a combination of asphalt feedstock and oil. For purposes of this patent, the term "asphalt feedstock" generally refers to the application of bitumen/asphalt feedstock, oil, and the combination of asphalt feedstock and oil.

The method then proceeds to block 104, in which the asphalt feedstock is heated to between 320° F. to 420° F.

At block 106, tire rubber is added to the heated asphalt feedstock and stirred. This is the first heating step. By way of example and not of limitation, a preliminary mixing process is initiated in the wetting tank (shown in FIG. 3 as reference 302) where the tire rubber is combined with the asphalt feedstock. This preliminary mixing process effectively disperses the dry tire rubber so that a uniform mixture can be pumped at between 320° F. to 420° F. into a separate mixing vessel or reaction vessel without clumping of the tire rubber. This first heating step generates a "first" processed bitumen/tire rubber mixture.

In another embodiment, the first processed bitumen/tire rubber mixture is pumped at between 375° F. to 400° F. This step is particularly necessary for GTR and other tire rubber sources that include small rubber particles, i.e. 5 mesh particles or smaller, which tend to clump together unless first dispersed within the asphalt feedstock. The tire rubber may include GTR, scrap tire rubber, tire rubber chunks or scraps, other such tire rubber or any combination thereof.

In a further embodiment, at least some of the asphalt feedstock includes Trinidad Lake Asphalt, which is a thermoplastic material. The Trinidad Lake Asphalt acts as a carrier for the tire rubber into the wetting tank.

In a broad illustrative embodiment, 1% or less by weight up to 70% by weight of tire rubber is added to the heated asphalt feedstock. In a narrower illustrative embodiment, 5% to 50% by weight of tire rubber is added to the heated asphalt feedstock. In an even narrower illustrative embodiment, 7% to 30% by weight of tire rubber is added to the heated asphalt feedstock. In embodiments utilizing 50% or more tire rubber, the tire rubber is added to bitumen with stirring to obtain even heat distribution.

At block 108, the wetted and heated mixture of tire rubber and asphalt feedstock comprising the first processed bitumen/tire rubber mixture is transferred from the wetting tank to a reactor mixing vessel (shown in FIG. 3 as reference 304).

At decision diamond 110, a determination is made whether to add Nitrogen ($N_2$) or other non-oxygenated gas to the mixing chamber. The illustrative application of Nitrogen to the mixing chamber ensures that there is little or no oxidation in the mixing chamber. The use of a Nitrogen blanket or other non-oxygenated gas excludes air and oxygen from the reactor environment by displacing air and oxygen from the headspace above the mixture of the tire rubber and asphalt feedstock. However, there may be circumstances where some oxidation is necessary and thus some air or oxygen enters or is allowed to enter the reactor environment. In another illustrative embodiment, the mixing chamber has some air, but is surrounded by an inert atmosphere so there is minimal oxidation.

In operation, Nitrogen ($N_2$) is added to the top of the reactor, i.e. mixing vessel, to provide a low pressure sweep in the headspace of the mixing vessel to remove the air and prevent oxygen entrapment in the first processed asphalt bitumen feedstock/tire rubber mixture during the reaction in block 110. Additionally, Nitrogen may also be introduced from the bottom of the reactor. In certain embodiments, Nitrogen may be introduced in the headspace and the bottom of the mixing vessel.

Generally, the mixing vessel is purged and then swept to remove oxygen from the headspace of the vessel. The purge may be performed by vacuuming the mixing vessel headspace during generation of the tire rubber asphalt compound and prior to flushing the headspace with nitrogen or other non-oxygenated gas. Alternatively, no vacuuming of the headspace may be performed, and instead the headspace may simply be flooded with non-oxygenated gas to displace oxygen from the headspace. Removal of oxygen prevents oxidation at temperatures approaching or even exceeding the lowest flash point of the mixture components, and prevents autoignition at processing temperatures up to 700° F.

At block 112, the first processed asphalt bitumen feedstock/tire rubber mixture undergoes a second heating step, in which the first processed asphalt bitumen feedstock/tire rubber mixture is heated to between 525° F.-700° F. in the illustrative mixing vessel, which is also interchangeably referred to as a "reactor" or "reaction vessel." In a narrower illustrative embodiment, the first processed bitumen/tire rubber mixture is heated to 575° F.-625° F. during the second heating step. In another narrower illustrative embodiment, the first processed asphalt feedstock/tire rubber mixture is heated to 600° F.-650° F. during the second heating step. In an even narrower illustrative embodiment, the first processed bitumen/tire rubber mixture is heated to 590° F.-610° F. during the second heating step.

The first processed bitumen/tire rubber mixture is subjected to a second heating where it is mixed at the prescribed temperature range of 525° F.-700° F. for between 5 minutes to 360 minutes. This second heating step results in a dissolved tire rubber bitumen compound, also termed an RDP compound or RDP product. In a narrower illustrative embodiment, the first processed asphalt feedstock/tire rubber mixture is mixed for between 5 minutes to 60 minutes.

In one illustrative embodiment, the mixing vessel includes a circulating pump that uniformly mixes the first processed bitumen/tire rubber mixture during the second heating process in the reaction mixing vessel. In another illustrative embodiment, a stirrer or agitator is used within the reaction mixing vessel. The uniform mixing process avoids hot spots within the reaction vessel, i.e. mixing chamber. Additionally, the uniform mixing produces an even heating rate as the first processed bitumen/tire rubber mixture is raised from between 320° F. to 420° F. to between 525° F. to 700° F. in the mixing vessel.

After the second heating step at block 112, the first processed asphalt feedstock/tire rubber mixture is converted to the RDP compound by fully dissolving the tire rubber into the bitumen. Additional processing may be performed on the RDP compound to produce a further modified and/or enhanced dissolved tire rubber bitumen as described in below. The RDP product may in some instances also be the final RDP product (as described in U.S. Pat. No. 10,843, 966).

At decision diamond 114, a determination is made whether to add sulfur to the reactor to cross-link the various polymers, rubbers, and oils of the RDP product to generate a "modified" RDP product. The cross-links comprise Sulfur-Carbon ("S—C") bonds and/or Carbon-Carbon ("C—C") bonds between the various polymers, rubbers, and oils of the RDP product.

The inventors hypothesize that this cross-linking has the effect of preventing the fragmentation and degradation of natural rubber and polymers dissolved therein, as well as incorporating volatile organic compounds ("VOCs") into the polymers and natural rubber of the resulting modified RDP product. These crosslinks may be between one polymer and another polymer, between one rubber compound and another rubber compound, between one oil and another oil, between a polymer and a rubber, between a polymer and an oil, between a rubber and an oil, and between a polymer, a rubber compound, or an oil and a VOC. Together, these cross-linking operations reduce the mass loss of the resulting modified RDP product by cross-linking VOCs to one another, polymer additives, and components of the bitumen and tire rubber comprising the RDP product. VOCs may autoignite under the high operating temperatures of the rapid digestion process, and are less able to do so when cross-linked, such as by sulfur. Thus, removal and/or reduction of accumulated VOCs creates a much safer workplace. The reduction in mass loss causes a corresponding increase in the flash point and thereby produces a more stable bitumen-based compound (i.e., the modified RDP compound) through a safer process as a result of VOC incorporation. In one embodiment, the sulfur may be added after an additional application of vacuum to the headspace, removing a majority of VOCs from that headspace.

In a further embodiment, vacuum may be applied to the headspace after addition of the sulfur. The application of vacuum may be performed once or in repeated cycles interspersed by flushing the headspace with nitrogen, a non-oxygenated gas, or a combination thereof. Each of these additional applications of vacuum reduce the amount of VOCs present in the reactor and therefore present in the modified RDP product.

In another embodiment, sulfur is added in the reactor before block 112, to the first processed asphalt feedstock/tire rubber mixture. This earlier addition of sulfur allows for VOCs, portions of the tire rubber components, asphalt, and polymer additives to begin cross-linking prior to exposure to the operating temperature of 525° F.-700° F. in the reactor. The product resulting from addition of sulfur at this earlier stage of the method 100 is termed the "modified" first processed bitumen/tire rubber mixture. Inventors hypothesize that this "preventative" cross-linking reduces the occurrence of fragmentation, the generation of VOCs, the total amount of VOCs emitted from the modified first processed asphalt feedstock/tire rubber mixture during preparation, and the mass loss of the resulting modified RDP product.

Mass loss is an important challenge to overcome for dissolved tire rubber bitumens compounds, as the tire rubbers comprise a greater concentration of low boiling point compounds than bitumen generally. As such, the more tire rubber that is added to bitumen to produce the first processed asphalt feedstock/tire rubber mixture, the RDP product, and/or their "modified" versions, the greater the mass loss of those resulting compounds. Importantly, a key indicator of binder aging is the loss of smaller molecules (such as, but not limited to, VOCs) that improve a bitumen compound's viscosity. As the amount of mass loss increases, asphalt binders age and become less viscous. Additionally, since mass loss is attributed to the loss of smaller molecules, the flashpoint of compounds with high mass loss is much lower than compounds with low mass loss. Most applicable regulatory agencies require asphalt paving compounds to have mass loss of 1% or less as determined by the RTFO test described in AASHTO T240 and ASTM D2872. Thus, dissolved tire rubber compounds having greater than 1 mass loss may not be commercially useful for any paving applications due to regulatory concerns. However, the addition of sulfur as a cross-linking agent reduces mass loss concerns by trapping these smaller molecules within the polymer network of the modified RDP compound.

The added sulfur may be any type of elemental sulfur, such as cyclic $S_6$, $S_7$, $S_8$, $S_{12}$, $S_{18}$, rhombic sulfur ($S_\alpha$), monoclinic sulfur ($S_\beta$); amorphous ("plastic") sulfur; poly-cationic sulfur, such as $S_8^{2+}$, $S_4^{2+}$, $S_{16}^{2+}$, which may be a sulfur salt with a suitable anion; anionic sulfur salts, such as $Na_2S_8$; and any other commercially available sulfur source. Further, the added sulfur may be in the form of a powder, a slurry, or molten.

At block 116, the RDP compound and/or modified RDP compound is quenched with an addition of asphalt, which cools the RDP compound to 500° F. or less and decreases percent rubber content of the RDP compound. In other embodiments, the resulting RDP compound is cooled to 50° F. below the Cleveland Open Cup ("COC") flash point of the dissolved tire rubber bitumen compound. In still other illustrative embodiments, water may be used to cool down the RDP compound and/or modified versions thereof to 500° F. or less. In another embodiment, the dissolved tire rubber bitumen mixture is cooled by a heat exchanger. In an alternative embodiment, any sulfur added at decision diamond 114 may instead be added after the cooling step of block 116, when the RDP compound has been cooled below the flash point of the mixture. In some embodiments, the cooled dissolved tire rubber bitumen compound is transferred to a storage vessel or processing vessel. The RDP compound and/or modified versions thereof may undergo further modification in the processing vessel. The storage or processing vessel may be metal, and particularly of a stainless steel construction. The storage vessel may be open to atmosphere or enclosed, and while such enclosure need not be air tight, it may be a chamber sealed from external atmosphere.

The resulting RDP compound experiences a significant increase of measured penetration depth at 77° F. over the original bitumen or asphalt feedstock while minimizing the oxidation and aging reactions associated with exposure of bitumen to high temperatures.

The inventors hypothesize that the heated tire rubber releases process oils from the tire rubber into the maltene fraction of the bitumen or asphalt feedstock, which improves both the oxidation resistance and ductility properties. Additionally, the inventors hypothesize that the bitumen is actually rejuvenated by the increase of the maltene to asphaltene fraction as observed when processing bitumen with vulcanized rubber, i.e. the dissolved tire rubber bitumen compounds and modified versions thereof produced by this method 100.

The inventors also hypothesize that the Sulfur-Carbon ("S—C") bonds are easier to break than the Carbon-Carbon ("C—C") bonds. In other words, the heating process described herein "devulcanizes" the rubber by removing the cross-linking caused by the S—C bonds between the polymer chains having C—C bonds. The result is the more soluble polymers, i.e. oils with C—C bonds, are dissolved in the mixing vessel. In some embodiments, this dissolution of soluble polymers occurs prior to increasing the temperature in the reaction vessel to 525° F.-700° F.

This hypothesis is supported by the finding that the addition and dissolution of tire rubber reduces the flash point of the bitumen starting material. For example, an original bitumen flux COC flash point was 687° F. After incorporation of 20% tire rubber and a second heating at 600° F. for 30 minutes, the COC flash point of the resulting RDP compound dropped to 608° F. This drop in flash point is caused by more soluble oils being released from the tire rubber. The process oils used to manufacture tires have flash points ranging from 400° F.-500° F., thus the flash point would be reduced when the oils are released from their fixated state in the tire rubber.

At decision diamond 118, the method may proceed to enhance the resulting RDP compound and modified versions thereof by addition of a wide range of polymers such as styrenic block copolymers (SBCs), olefinic elastomers, olefinic vinyl acetates, natural rubber, and various agents that emulsify the composition. The use of polymers treated with various oils, asphalt flux, or plasticizers prior to mixing with the dissolved tire rubber bitumen compound of the second heating process allows for the incorporation of high molecular weight polymers at relatively low quantities that enhance both the flexibility and elasticity of the dissolved tire rubber bitumen compound. Also, common emulsification agents and reagents can be used to adjust pH for the production of either cationic or anion emulsions. In various embodiments, the tire rubber may consist of GTR, scrap tire rubber, tire rubber chunks, or any combination thereof.

In some embodiments, SBCs are added to the RDP compound and/or the modified RDP compound at decision diamond 118. In one embodiment, SBCs are added to the first processed asphalt feedstock/tire rubber compound prior to the second heating process of step 112. In another embodiment, SBCs are added to the first processed asphalt feedstock/tire rubber compound during the second heating process of step 112. In still another embodiment, SBCs are added to the intermediate RDP compound after the second heating process of step 112. In some embodiments, the SBCs include SEBS.

Furthermore, similar to the recent use of saponification agents, such as stearamides and phosphates, in bitumen, saponification agents can be added to the resulting dissolved tire rubber bitumen compound and modified versions thereof to adjust the properties of softening point and penetration depth while allowing good viscosity control as needed. The dissolved tire rubber bitumen compound may also be combined with saturated fabrics such as fiberglass, polyester, rayon, nylon, or combinations thereof in various applications, such as paving, roofing, mining liners, and waterproofing. Further still the dissolved tire rubber bitumen compound may be used in drilling fluid applications to improve the viscosity curve of bitumen, thereby expanding the range of formulation options available to a drill fluid chemist.

Further still, the use of GTR and other vulcanized rubber containing carbon black enhances the black color of the RDP tire rubber bitumen compound. This enhancement in addition to the improved weathering commonly associated with carbon black, allows the paving produced with RDP compounds to yield a long lasting high contrast surface for traffic marking that greatly improves both day and night time visibility. Additionally, in roofing applications, the carbon black stabilizes the roof coating, improving weathering resistance, and provides a deep black uniform surface for enhanced appearance of various blended and single color granule applications.

Modified Method for Dissolving Tire Rubber

Figure 2A:
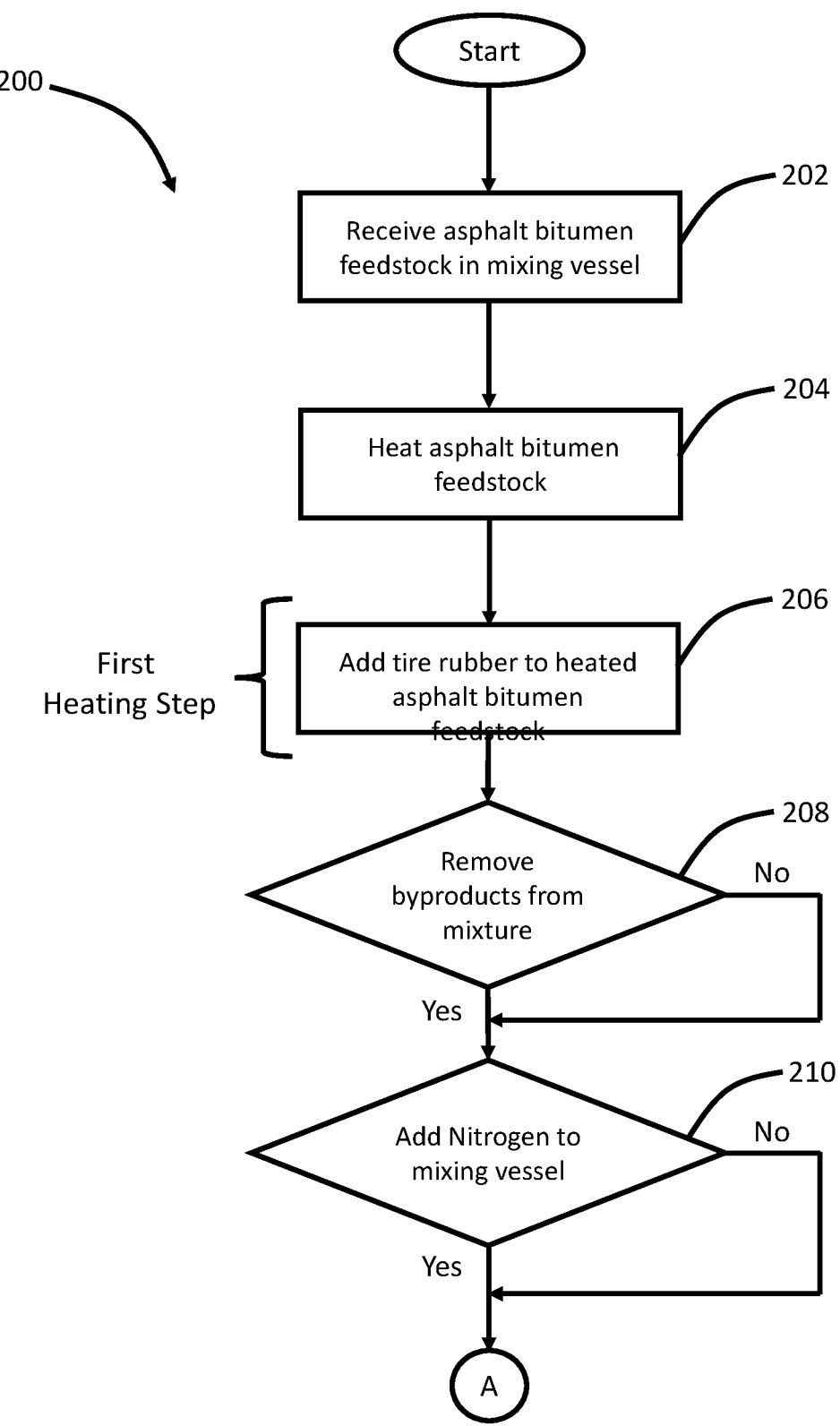
FIGS. 2A and 2B show a flow chart of a modified method for generating a dissolved rubber compound from tire rubber and an asphalt feedstock.
Figure 2B:
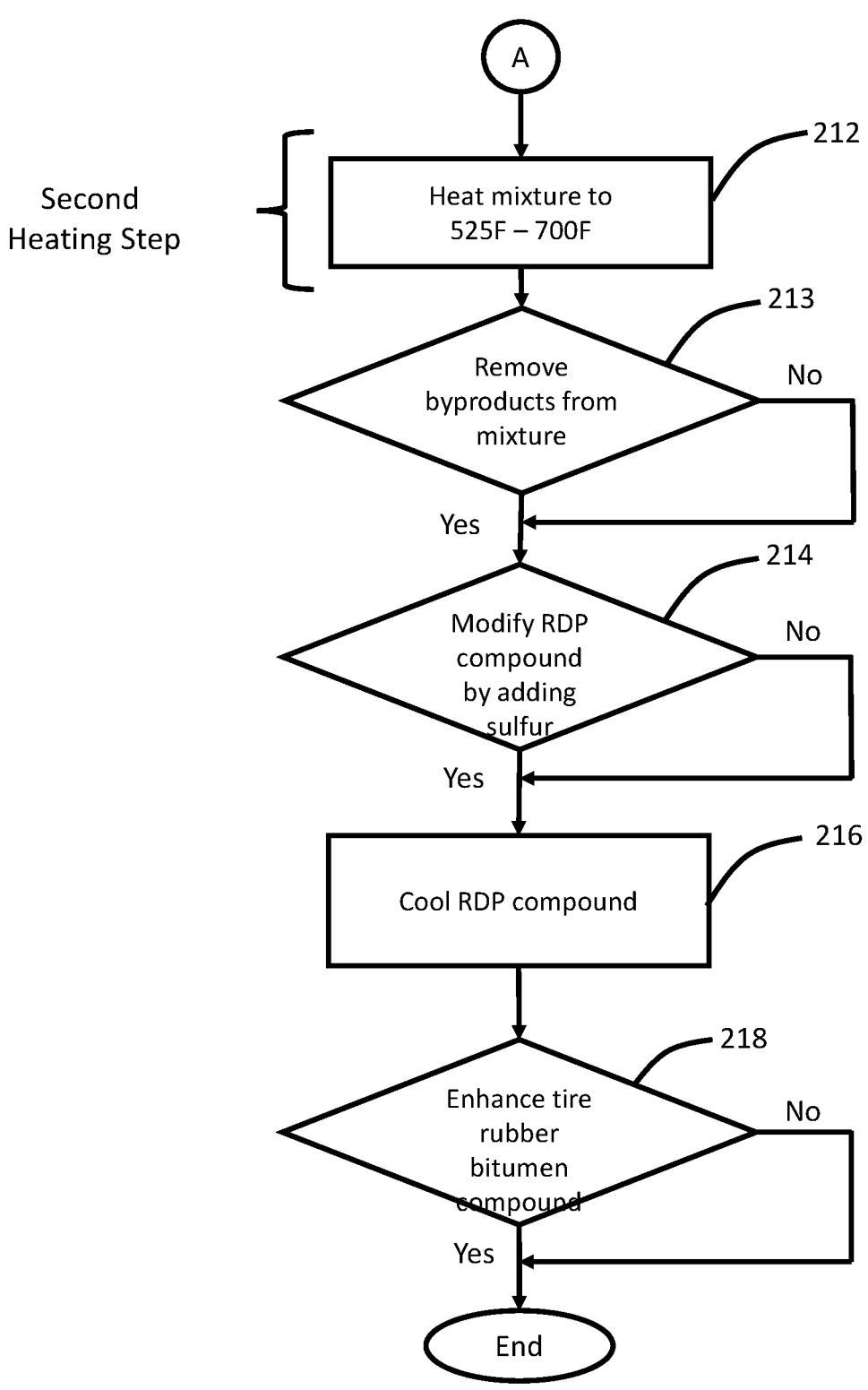

The illustrative method 100 for dissolving tire rubber in bitumen may be modified to receive vulcanized rubber from entire tires or partially cut tires as shown in method 200 presented in FIGS. 2A and 2B. While most processes require that the vulcanized rubber such as tires be ground to remove the bias and steel ply adding substantial cost to the preparation of the material, the illustrative method 200 shown in FIGS. 2A and 2B supports utilization of entire tires or partially cut tire scraps without further processing to remove the bias, steel, or plies embedded within a typical vehicle tire. The tire rubber is placed into a bath of oil or asphalt feedstock in a reaction vessel (shown below in FIG. 4 as reference 402). The rubber and bitumen mixture is then heated and stirred to provide uniform heat distribution, without need of initial heating and wetting in a wetting tank to prevent clumping of the tire rubber because of the large size the tire rubber scraps (1 square inch or larger) and whole tires used as the rubber source. The tire rubber may include whole tires, scrap tire rubber, tire rubber chunks, tire rubber scraps, shredded tires, cut or partially cut tires, other such tire rubber, or any combination thereof.

In another embodiment, at least some of the asphalt feedstock includes Trinidad Lake Asphalt, which is a thermoplastic material. The Trinidad Lake Asphalt acts as a carrier for the tire rubber directly into the reactor mixing vessel.

As with method 100 above, the method 200 shown in FIGS. 2A and 2B, is initiated at block 202 where an appropriate asphalt feedstock is selected and received directly in the reaction vessel. By way of example and not of limitation, the illustrative asphalt feedstock has a penetration of 135 dmm @77° F. In an alternative embodiment, an oil compound is used instead of bitumen at block 202. Note, the method 200 may use only asphalt feedstock, only oil, or a combination of asphalt feedstock and oil. For purposes of this patent, the term "asphalt feedstock" generally refers to the application of bitumen, oil, and the combination of bitumen and oil.

The method then proceeds to block 204, in which the asphalt feedstock is heated to between 320° F. and 420° F.

At block 206, tire rubber is added to the heated asphalt feedstock in the mixing vessel, without wetting, and stirred. This first heating step generates a "first" processed bitumen/tire rubber mixture. This removes the preliminary mixing process required to effectively disperse small dry tire rubber chunks to provide a uniform mixture for pumping transfer at between 375° F. to 400° F. into the separate mixing vessel or reaction vessel (shown in FIG. 3 as reference 304). Further, elimination of the separate wetting tank and necessary transfer of undissolved tire rubber suspended in bitumen into the reaction vessel for high temperature processing, allows utilization of the integrated reactor (shown in FIG. 4 as reference 402) that lacks a separate wetting vessel.

In another embodiment, wetting is performed in the mixing vessel in addition to dissolution of the tire rubber. This embodiment still eliminates the separate wetting tank and transfer of undissolved tire rubber suspended in bitumen into the reaction vessel/mixing tank for high temperature processing.

In various embodiments, up to 70% of the first processed asphalt feedstock/tire rubber compound comprises tire rubber. In narrower embodiments, 5% to 50% by weight of the first processed asphalt feedstock/rubber compound comprises tire rubber. In an even narrower illustrative embodiment, 7% to 30% by weight of tire rubber is added to the heated asphalt feedstock. In one embodiment, the first processed asphalt feedstock/tire rubber compound is 50% tire rubber by weight. The tire rubber can be large pieces that range in width from 1" up to the entire width of the source tire and from 1" to 12" in length. In other embodiments, tire rubber can be whole scrap tires. In some embodiments, the first processed asphalt feedstock/tire rubber compound comprises 20%-50% by weight tire rubber. In embodiments utilizing 50% or more tire rubber, the tire rubber is added to bitumen media having a penetration of 0 dmm to 200 dmm with stirring to obtain even heat distribution.

At decision diamond 208, after the vulcanized rubber, oil, and carbon black are released from the tire ply into the liquid medium of the oil compound or asphalt feedstock a determination is made whether to remove byproducts from the first processed asphalt feedstock/tire rubber mixture. When it is determined to remove the byproducts, the dissolved material that is the liquid medium (i.e., the first processed asphalt feedstock/tire rubber mixture) is then drained from the mixing vessel leaving the ply material, steel belting, steel wire, and generally insoluble byproducts behind. The byproducts are then removed and washed with a suitable solvent to remove excess dissolved material (the first processed asphalt feedstock/tire rubber mixture) from the ply, belts, and other byproducts. The removal may be performed by a separator within the mixing vessel. The separator may be a sieve or a grate configured to allow dissolved material (oil/asphalt), and dissolved tire rubber to pass through while stopping or retaining undissolved byproducts. In some embodiments, a magnet is used to remove the steel belts, which can then be recycled. The separated metallic alloy or steel waste material can then be subjected to pyrolytic heating to further remove tire rubber, bitumen, and/or oil.

The first processed asphalt feedstock/tire rubber mixture is contained in a mixing vessel, and at decision diamond 210, a determination is made whether to add Nitrogen or other non-oxygenated gas to the mixing chamber. The application of Nitrogen to the mixing chamber ensures that there is little or no oxidation of the first processed asphalt feedstock/tire rubber mixture. The mixing vessel is purged and then swept to remove oxygen from the headspace of the vessel. The purge may be performed by vacuuming the mixing vessel headspace during a second heating process described below in block 212 that generates the RDP compound. This purge may include flushing the vacuumed headspace with nitrogen or other non-oxygenated gas after the second heating process described below in block 212. The use of a Nitrogen blanket or other non-oxygenated gas excludes oxygen from the reactor environment by displacing any remaining oxygen from the headspace above the first processed asphalt feedstock/tire rubber mixture. Alternatively, no vacuuming may be performed, and instead the headspace may simply be flooded with Nitrogen, non-oxygenated gas, or a combination thereof to displace oxygen from the headspace. Removal of oxygen prevents oxidation at temperatures approaching or even exceeding the lowest flash point of the mixture components, and prevents autoignition at processing temperatures up to 700° F.

At block 212 the first processed asphalt feedstock/tire rubber mixture undergoes a second heating process where the mixture is heated to between 525° F.-700° F. in the illustrative mixing vessel (shown in FIG. 4 as reference 402) for between 5 minutes to 360 minutes with mixing. In one embodiment, upon adding the tire rubber to the asphalt feedstock during the first heating process, the resulting first processed asphalt feedstock/tire rubber mixture is rapidly heated to 600° F. to 650° F. for 5 minutes to 360 minutes under stirring. In another illustrative embodiment, the first processed asphalt feedstock/tire rubber mixture is heated to 575° F.-625° F. In a narrower illustrative embodiment, the first processed asphalt feedstock/tire rubber mixture is heated to 590° F.-610° F.

In some embodiments, during this second heating and stirring process the steel completely separates from the tire rubber, and the decomposed tire rubber, process oils, carbon black, mineral fibers, and even some or all of the polyester fabrics become fully incorporated into the bitumen to generate the dissolve tire rubber in bitumen RDP compound. The steel physically separates from the tire rubber prior to the tire rubber's dissolution into the asphalt feedstock/oil due to the difference in the thermal expansion rate between steel and rubber. In these embodiments, the byproducts were not removed after or during the initial heating and mixing, but instead remained within the first processed asphalt feedstock/tire rubber mixture. In these embodiments, the byproducts are removed and washed with a suitable solvent to remove excess dissolved tire rubber bitumen compound from the ply and belts after heating to 525° F.-700° F. In a narrower illustrative embodiment, the first processed asphalt feedstock and tire rubber mixture is mixed for between 5 minutes to 60 minutes. In one illustrative embodiment, the mixing vessel includes a circulating pump (not shown) that uniformly mixes the first processed asphalt feedstock and tire rubber mixture during the second heating process in the mixing vessel. In another illustrative embodiment, a stirrer or agitator is used within the mixing vessel.

The uniform mixing process avoids hot spots within the reaction vessel, i.e. mixing chamber. Additionally, the uniform mixing produces an even heating rate as the first processed asphalt feedstock and tire rubber mixture is raised from between 320° F. to 420° F. to between 525° F. to 700° F. in the mixing vessel.

After the second heating step at block 212, the first processed asphalt feedstock/tire rubber mixture is converted to a RDP compound. Additional processing may be performed to produce a further modified tire rubber bitumen RDP compound as described in detail below. The dissolved tire rubber bitumen RDP product is generated after heating to between 525° F.-700° F. in the reaction mixing vessel. The RDP product may in some instances also be the final RDP product (as described in U.S. Pat. No. 10,843,966).

At decision diamond 213, a determination is made whether to remove byproducts from the intermediate RDP product. Byproducts are only removed from the RDP compound when the byproducts were not removed earlier at decision diamond 208. When byproducts are present in the RDP product and a determination is made to remove those byproducts in decision diamond 213, either the RDP product is removed from the byproducts, or the byproducts are removed from the RDP product. Thus, the RDP product may be drained from the mixing vessel, leaving the ply material, steel belting, steel wire, and insoluble byproducts behind in the mixing vessel. Alternatively, a separator within the mixing vessel allows the RDP product to pass through while stopping or retaining the undissolved byproducts. In both cases, the byproducts are removed and washed with a suitable solvent to remove excess dissolved material (i.e., the dissolved tire rubber bitumen compound) from the ply, belts, and other byproducts. The separated metallic alloy or steel waste material can then be subjected to pyrolytic heating to further remove tire rubber, bitumen, oil, and/or RDP compound.

At decision diamond 214, a determination is made whether to add sulfur to the reactor vessel to cross-link the various polymers, rubbers, and oils of the RDP compound to generate a "modified" RDP product. These crosslinks may be between one polymer and another polymer, between one rubber compound and another rubber compound, between one oil and another oil, between a polymer and a rubber, between a polymer and an oil, between a rubber and an oil, and between a polymer, a rubber compound, or an oil and a VOC. Together, these cross-linking operations reduce the mass loss of the resulting modified RDP product by cross-linking VOCs to one another, polymer additives, and components of the bitumen and tire rubber comprising the modified RDP compound. VOCs may autoignite under the high operating temperatures of the rapid digestion process, and are less able to do so when cross-linked, such as by sulfur. Thus, removal and/or reduction of accumulated VOCs creates a much safer workplace. The reduction in mass loss causes a corresponding increase in the flash point and thereby produces a more stable RDP bitumen compound through a safer process as a result of VOC incorporation. In one embodiment, the sulfur may be added after an additional application of vacuum to the headspace, removing a majority of VOCs from that headspace.

In a further embodiment, vacuum may be applied to the headspace after addition of the sulfur. The application of vacuum may be performed once or in repeated cycles interspersed by flushing the headspace with nitrogen, a non-oxygenated gas, or a combination thereof. Each of these additional applications of vacuum reduce the amount of VOCs present in the reactor and therefore present in the modified RDP product.

In another embodiment, sulfur is added to the reactor before block 212 to the first processed asphalt feedstock/tire rubber mixture. This earlier addition of sulfur allows for VOCs, portions of the tire rubber components, bitumen, and polymer additives to begin cross-linking prior to exposure to the operating temperature of 525° F.-700° F. in the reactor. The product resulting from addition of sulfur at this earlier stage of the method 200 is termed "modified" first processed asphalt feedstock/tire rubber product. Inventors hypothesize that this "preventative" cross-linking reduces the occurrence of fragmentation, the generation of VOCs, the total amount of VOCs emitted from the modified first processed asphalt feedstock/tire rubber mixture during preparation, and the mass loss of the resulting modified RDP product.

Mass loss is an important challenge to overcome for dissolved tire rubber compounds, as the tire rubbers comprise a greater concentration of low boiling point compounds than bitumen generally. As such, the more tire rubber that is added to bitumen to produce the first processed asphalt feedstock/tire rubber mixture, the resulting RDP product, and/or "modified" versions thereof, the greater the mass loss of the compound. Importantly, a key indicator of binder aging is the loss of smaller molecules (such as, but not limited to, VOCs) that improve an asphalt compound's viscosity. As the amount of mass loss increases, asphalt binders age and become less viscous. Additionally, since mass loss is attributed to the loss of smaller molecules, the flashpoint of compounds with high mass loss is much lower than compounds with low mass loss. Most applicable regulatory agencies require asphalt paving compounds to have mass loss of 1% or less as determined by the RTFO test described in AASHTO T240 and ASTM D2872. Thus, RDP compounds having greater than 1% mass loss may not be commercially useful for any paving applications due to regulatory concerns. However, the addition of sulfur as a cross-linking reduces mass loss concerns by trapping these smaller molecules within the polymer network of the resulting modified RDP compound.

The added sulfur may be any type of elemental sulfur, such as cyclic $S_6$, $S_7$, $S_8$, $S_{12}$, $S_{18}$, rhombic sulfur ($S_\alpha$), monoclinic sulfur ($S_\beta$); amorphous ("plastic") sulfur; poly-cationic sulfur, such as $S_8^{2+}$, $S_4^{2+}$, $S_{16}^{2+}$, which may be a sulfur salt with a suitable anion; anionic sulfur salts, such as $Na_2S_8$; and any other commercially available sulfur source. Further, the added sulfur may be in the form of a powder, a slurry, or molten.

The resulting dissolved tire rubber bitumen compound (i.e., the RDP product) is then cooled to 400° F. to 500° F., or as low as 350° F. at block 216. In other embodiments, the RDP compound is cooled to 50° F. below the COC flash point of the RDP compound. In some embodiments, the resulting RDP bitumen compound can be cooled through a second addition of unheated asphalt feedstock or oil compound that quenches the RDP compound. In other embodiments, the RDP bitumen compound can be cooled by a heat exchanger. After cooling, in embodiments where the byproducts were not removed earlier, the dissolved tire rubber bitumen compound is decanted from the steel belting and other byproducts remaining in the RDP compound. The decanted steel byproducts can then be subjected to pyrolytic heating to clean the steel byproducts. In an alternative embodiment, the sulfur added at block 214 may instead be added after the cooling step of block 216, when the RDP compound has been cooled below the flash point of the mixture. In some embodiments where the byproducts were removed earlier, the cooled dissolved tire rubber bitumen compound is transferred to a storage vessel or processing vessel. The RDP compound may undergo further modification in the processing vessel. The storage vessel may be metal, and particularly of a stainless steel construction. The storage vessel may be open to atmosphere or enclosed, and while such enclosure need not be air tight, it may be a chamber sealed from external atmosphere.

In some embodiments, SBCs are added to the dissolved tire rubber bitumen compound at decision diamond 218 to produce an enhanced dissolved tire rubber bitumen compound. In one embodiment, SBCs are added to the first processed asphalt feedstock/tire rubber bitumen mixture prior to the second heating process of step 212. In another embodiment, SBCs are added to the second processed asphalt feedstock/tire rubber bitumen compound during the second heating process of step 212. In still another embodiment, SBCs are added to the RDP compound after the second heating process of step 212. In some embodiments, the SBCs include SEBS.

In one embodiment, the byproducts remaining in the RDP compound and enhanced versions thereof include materials having a flashpoint in the range of fuel oil. A significant portion of the byproduct materials having a flashpoint in the range of fuel oil are collected in a knock out drum, a scrubber, a vacuum unit, or other separation device. The knock out drum uses the collected fuel oil byproduct to seal the head space of the reaction vessel from oxygen. The byproduct waste oil accumulates and overflows into a collection tank, and can then be harvested for sale or cleaned for use as a fuel source to supplement fuel used in the RDP production processes.

In still another embodiment, the reaction vessel or mixing vessel applies a vacuum to the head space after reaching 600° F. for a period of at least 1 hour. The 1 hour time period allows lighter weight materials to separate from the first processed asphalt feedstock/tire rubber mixture and/or the RDP compound and enter the gaseous phase occupying the headspace of the mixing vessel. Upon entering the headspace, the lighter weight materials may be removed by application of the vacuum. The lighter weight materials may include diesel fuels and VOCs. This embodiment increases the flash point of the dissolved tire rubber bitumen product to between 450° F. to 550° F. under vacuum.

Furthermore, similar to the recent use of saponification agents, such as stearamides and phosphates, in bitumen, saponification agents can be added to the resulting RDP compound and modified versions thereof to adjust the softening point and penetration depth properties while allowing good viscosity control as needed. The dissolved tire rubber bitumen compound may also be combined with saturated fabrics such as fiberglass, polyester, rayon, nylon, or combinations thereof in various applications, such as paving, roofing, mining liners, and waterproofing. Further still the dissolved tire rubber bitumen compound may be used in drilling fluid applications to improve the viscosity curve of bitumen, thereby expanding the range of formulation options available to a drill fluid chemist.

Further still, the use of GTR and other vulcanized rubber containing carbon black enhances the black color of the dissolved tire rubber bitumen compound. This enhancement in addition to the improved weathering commonly associated with carbon black, allows the paving produced with dissolved tire rubber bitumen compounds to yield a long lasting high contrast surface for traffic marking that greatly improves both day and nighttime visibility. Additionally, in roofing applications, the carbon black stabilizes the roof coating, improving weathering resistance, and provides a deep black uniform surface for enhanced appearance of various blended and single color granule applications.

In embodiments where the RDP compound produced by the second heating in step 212 is both modified at step 214 and enhanced in step 218, the resulting product may be termed the enhanced modified RDP compound or the enhanced modified dissolved tire rubber bitumen compound.

While the modified method 200 retains the beneficial attributes of the method 100, a further primary advantage to this modified method 200 for dissolving tire rubber is the simplification of the pre-treatment required to process tires for recycling. The modified method eliminates the need for grinding tires to mesh size material using expensive cryogenic or hydrological systems. Since the steel belts and ply are very large sized in the dissolved medium, i.e., the first and/or second asphalt feedstock/tire rubber bitumen mixtures, they are easily recovered with simple straining and filtering mechanisms for subsequent cleaning with suitable solvents for recycling. Additional advantages flow from inclusion of unprocessed tire rubber, including improved accelerated aging and crack resistance of paving and roofing asphalt materials. A further advantage of incorporating unprocessed tire rubber reduces the viscosity of the RDP compound, thereby improving the flow characteristics of the RDP product, allowing for lower operating temperatures and decreasing the energy cost associated with using the RDP product as compared to an asphalt compound that does not incorporate dissolved tire rubber. The incorporation of 50% or more tire rubber into the dissolved tire rubber bitumen compound dramatically reduces the cost of the final paving product, while providing an outlet for disposal of used highway aggregates, as well as post-industrial and post-consumer roofing shingles. Further, the addition of any amount of tire rubber (and especially 50% or more) to the asphalt feedstock reduces cost indirectly by improving the solubility and compatibility of other polymer based modifiers, both styrenic and olefinic. A further secondary advantage flowing from the removal of the wetting step in modified method 200 is that the more integrated modified system (shown in FIG. 4 as reference 400) may be employed, which improves the security and safety of the method through the more durable reactor of the modified system.

System for Dissolving Tire Rubber

Referring now to FIG. 3 there is shown a system 300 that controls a batch process that dissolves tire rubber in asphalt or oil. The illustrative system 300 includes a wetting tank 302 that receives an asphalt feedstock or an oil compound. Additionally, tire rubber 306 may also be received by the wetting tank 302. Wetting tank 302 performs preliminary mixing and a first heating process that heats the tire rubber 306 and the asphalt/oil 308 to between 375° F. to 400° F. using a heater 303 external to the wetting tank 302.

The first processed asphalt feedstock/tire rubber mixture of tire rubber and heated asphalt or oil is then pumped to a reactor (mixing vessel) 304, which is filled to the desired operating level, e.g. 65% to 75% of the column height. In some embodiments, the reactor 304 includes an agitator that stirs the first processed asphalt feedstock/tire rubber mixture of tire rubber and heated bitumen or oil.

The illustrative reactor 304 is a vertical vessel equipped with a gas distribution component 310, which has a feeder at the top and bottom of the mixing vessel 304. The gas distribution component 310 may receive Nitrogen, air or any other such gas. In one illustrative embodiment, Nitrogen ($N_2$) is added to the top of the mixing vessel 304 to provide a low pressure sweep in the headspace of the mixing vessel to remove the air and prevent oxygen entrapment in the first processed bitumen/tire rubber mixture and resulting RDP compound during the reaction in block 112 of FIG. 1B.

Nitrogen may also be introduced from the bottom of the reactor or in the combination of the headspace and the bottom of the mixing vessel 304.

The first processed asphalt feedstock/tire rubber mixture of bitumen and tire rubber is heated to between 525° F. to 700° F. in the mixing vessel 304. In the illustrative embodiment, the mixing vessel includes a circulating pump 312 that uniformly mixes the bitumen and tire rubber of the first processed asphalt feedstock/tire rubber mixture during the second heating process in the mixing vessel 304. The uniform mixing process avoids hot spots within the reaction vessel 304, i.e. mixing chamber.

The fully dissolved/tire rubber bitumen compound resulting from the second heating process may be quenched with the addition of bitumen or oil 308 through an additional pump 313, which cools the RDP compound from between 525° F. to 700° F. down to between 500° F. or less. The pump 313 may transfer cool or unheated asphalt feedstock 308 directly into the reactor mixing vessel 304, as well as transfer the resulting RDP product out of the reactor mixing vessel 304 for post-production use, enhancement, and/or modification. In another illustrative embodiment, water may be used to cool down the illustrative RDP compound to 500° F. or less. In one embodiment, this cooling water may be sourced from the wetting tank 302.

The resulting RDP compound, also referred to as the "dissolved tire rubber bitumen compound" 315, experiences a significant increase of penetration at 77° F. over the original bitumen while minimizing the oxidation and aging reactions associated with exposure of bitumen to high temperatures.

Fumes produced in the process may be disposed of with a scrubber/condenser 314 that neutralizes and/or collects VOCs and other hazardous gases in the fumes.

Modified System for Dissolving Tire Rubber

Figure 4:
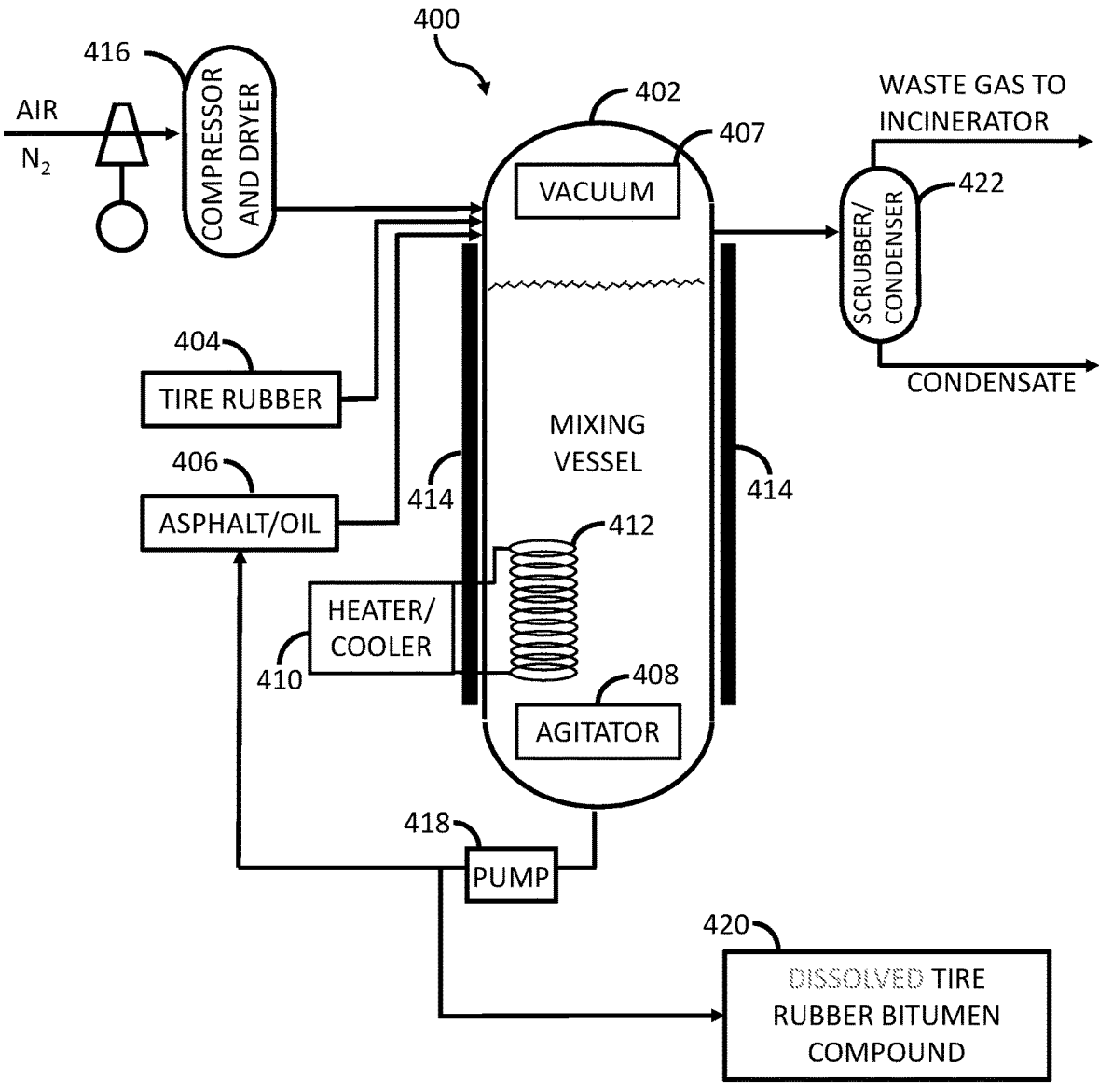
FIG. 4 shows a modified reaction system.

Referring now to FIG. 4 there is shown a system 400 that controls a process for dissolving tire rubber in bitumen or oil. The illustrative system 400 includes an integrated reactor 402, i.e. mixing vessel, that receives tire rubber 404 and an asphalt feedstock or an oil compound 406. The integrated reactor 402 has an exterior surrounding an interior space that receives the rubber and bitumen. By integrating various components and control elements into the mixing vessel 402, external attachment points and couplings are minimized and the integrity of the mixing vessel 402 is maximized. This maximized integrity allows the integrated mixing vessel 402 more reliably withstand greater temperatures and pressures, as well as achieve higher degrees of vacuum and lower levels of oxygen more efficiently. In some embodiments, the integrated reactor 402 is capable of withstanding temperatures ranging from −20° F. up to 700° F. and pressures ranging from vacuum up to 99 PSI. The higher degrees of vacuum and lower levels of oxygen are achieved because the mixing vessel 402 is configured to be sealed from the exterior atmosphere and includes a vacuum unit 407. The vacuum unit may be mounted within the interior reactor space, mounted to the exterior surface of the mixing vessel, or affixed to an external location and connected to the interior reactor space. The vacuum 407 is particularly configured to remove oxygen and other gases from the interior reactor space.

The integrated reactor 402 performs preliminary mixing with an internal agitator 408 and preliminary (or first) heating of the tire rubber 404 and the bitumen/oil 406 to between 375° F. to 400° F. with a temperature controller 410 (i.e., heater/cooler unit). The tire rubber may be unprocessed or relatively unprocessed and include undesirable byproducts, such as steel belts, fabric ply, metallic alloys, steel waste, and other non-rubber components of tires. Removal of these byproducts from the first processed tire rubber and asphalt mixture or from the dissolved tire rubber bitumen product may be performed by a separator (not shown) within the mixing vessel 402. The separator may be a sieve or a grate configured to allow dissolved material (i.e., oil, bitumen, dissolved rubber, and/or the first processed asphalt feedstock/tire rubber mixture) to pass through while stopping or retaining undissolved byproducts. In some embodiments, a magnet is used to remove the steel belts, which can then be recycled. The separated metallic alloy or steel waste material can then be subjected to pyrolytic heating to further remove bitumen, oil, tire rubber, and/or the RDP product.

The heater/cooler unit 410 includes heating/cooling coils 412 inside the integrated reactor 402 and a heating/cooling jacket 414 surrounding some or all of the exterior of the integrated reactor 402. The heating/cooling unit 410 cycles a fluid, such as an oil, through the heating/cooling coils 412 and/or heating/cooling jacket 414 at a desired temperature to both heat and cool the contents of the integrated reactor 402. The agitator 408 may be a paddle or other stirring implement located within the interior reactor space of the integrated reactor 402. The agitator 408 mixes and/or circulates the contents of the integrated reactor 402, i.e. the bitumen compound, the oil compound, the rubber, the RDP product, or any combination thereof.

The integrated reactor (mixing vessel) 402 receives the mixture of tire rubber and asphalt feedstock or oil compound up to a desired operating level, e.g. 65% to 75% of the column height with.

The illustrative reactor 402 is a vertical vessel equipped with a gas distribution component 416, which accesses the top and bottom of the vessel 402 through separate feeder ports. The gas distribution component 416 may include a compressor to transfer, supply, and/or pressurize the gases to be distributed to the interior reactor space. The gas distribution component 416 may also include a dryer that removes moisture and other contaminants from the gases to be distributed. The gas distribution component 416 may receive Nitrogen, a non-oxygenated gas, air, or any other such gas. In one illustrative embodiment, Nitrogen ($N_2$) is added to the top of the mixing vessel 402 to provide a low pressure sweep in the headspace of the mixing vessel 402 to remove the air and prevent oxygen entrapment in the first bitumen/tire rubber mixture and/or the RDP product during the heating processes in blocks 206 and 212 of FIGS. 2A and 2B. Nitrogen may also be introduced from the bottom of the reactor 402 or in the combination of the headspace and the bottom of the mixing vessel 402.

The first processed asphalt feedstock/tire rubber mixture of bitumen and tire rubber is heated to between 525° F. to 700° F. in the mixing vessel 402. In the illustrative embodiment, the agitator 408 internal to the mixing vessel 402 uniformly mixes the first processed bitumen and tire rubber mixture during the first and second heating processes. The uniform mixing process avoids hot spots within the reaction vessel 402, i.e. mixing chamber.

The dissolved tire rubber bitumen mixture may be quenched with the addition of bitumen or oil 406 through an external pump 418, which cools the dissolved tire rubber bitumen mixture from between 525° F. to 700° F. down to 500° F. or less. The pump 418 may transfer cool or unheated asphalt feedstock 406 directly into the reactor mixing vessel 402, as well as transfer the RDP product out of the reactor mixing vessel 402 for post-production use and/or modification. In another illustrative embodiment, water may be used to cool down the illustrative RDP product to 500° F. or less.

The resulting RDP compound experiences a significant increase of penetration at 77° F. over the original bitumen while minimizing the oxidation and aging reactions associated with exposure of bitumen to high temperatures.

Fumes produced in the process may be disposed of with a scrubber/condenser 422 that neutralizes and/or collects VOCs and other hazardous gases in the fumes. Additionally, the interior reactor space may also be configured to receive a sulfur compound that cross-links the dissolved rubber, the bitumen, the VOCs, the RDP product, or any combination thereof.

RDP Embodiments

In the illustrative embodiments presented herein, an asphalt feedstock is mixed with natural or synthetic rubber items, and the mixture is heated to 600° F. with stirring for at least 10 minutes. The illustrative embodiments show a substantial increase in the penetration of the resulting dissolved rubber and bitumen mixture or RDP compound, which is homogeneous and can be poured through a 100 mesh sieve. The RDP rubber and bitumen compound may be solubilized in D-Limonene with better than 99.0% passing through No. 54 Whatman filter paper.

Example 1

In this illustrative embodiment, an asphalt feedstock having a penetration of 135 dmm @ 77° F. is subjected to a first heating process where it is heated to between 320° F. to 420° F. An addition of GTR equal to 10% by weight of the resulting mixture was added to the heated bitumen and stirred at 4200 rpm. After 15 minutes of mixing, the mixing speed is reduced to 4000 rpm and stirring continues for an additional 15 minutes. During the stirring process, the mixture of bitumen and GTR (the first processed bitumen/GTR mixture) is subjected to a second heating process where it is heated to 605° F. The first processed bitumen/tire rubber mixture is then held at 600° F. to 605° F. for 15 minutes. After the first processed bitumen/tire rubber mixture is heated to 605° F. for 15 minutes, the stirrer is turned off and the mixture cools to between 350° F. to 360° F., from which cooled mixture samples are prepared for physical property testing. The resulting mixture is referred to as a dissolved tire rubber bitumen compound or RDP compound.

The solubility of the dissolved tire rubber bitumen compound was tested by dissolving 3 grams of the compound in a 125 ml of a solution composed of at least 90% D-Limonene CAS 5989-27-5. The solution was warmed gently on a hot plate with stirring for between 5 to 7 minutes—at which point the solid dissolved tire rubber bitumen compound sample is visibly dissolved in the D-Limonene. The solution was allowed to return to ambient temperature (about 15 minutes) and vacuum filtered using a No. 54 Whatman filter paper and Buchner funnel. It was found that 99.4% of the solution passed the filter leaving a gray-tan coloration on the filter paper.

TABLE I

| Property | Before Heating | After Heating | % Change |
|---|---|---|---|
| V275F D4402 (cP) | 250 | 352 | 71 |
| V350F D4402 (cP) | 48 | 83 | 173 |

TABLE I-continued

| Property | Before Heating | After Heating | % Change |
|---|---|---|---|
| Soft. Point D38, (° F.) | 112 | 111 | 0 |
| Pen 77° F. D5 (dmm) | 135 | 200 | 148 |
| G*/sin δ @ 58 C., (Pa S) | 0.958 | 0.960 | 0 |
| G*/sin δ @ 52 C., (Pa S) | 2.21 | 1.30 | −41 |
| *D-Limonene Solubility using D2042 (%) | NA | 99.4 | NA |

(*D-Limonene substituted for trichloroethylene for safety)

Table I presents the physical properties "before heating" the feedstock, which does not include the 10% GTR and "before heating" to 600° F. The addition of GTR and second heating to 600° F. results in a significant increase in viscosity as reflected by rows V275F and V350F. The increase in viscosity indicates that the GTR has been fully incorporated into the mixture. Thus, the GTR is substantially more than a particle dispersion in the dissolved bitumen/tire rubber mixture.

Table I also reflects that there is no significant change in softening point (Soft. Point) of the bitumen after the GTR is added and treated with the second heating process to 600° F. However, a substantial increase in penetration (Pen) is observed after the GTR is digested at 600° F. This increase in penetration is likely due to the release of compounding oils from the tire rubber into the bitumen, with little or no significant oxidation of the bitumen because of a Nitrogen purge on the reactor.

The G*/sin δ @58° C. (Pa S) is a rheological measure of road binder stiffness before any type of age conditioning. In this illustrative example, the oil released from the GTR has minimal impact on the road binder stiffness.

The G*/sin δ @52° C., (Pa S) is a rheological measure representing the measure of road binder stiffness by aging in a Rolling Thin Film Oven (RTFO) for 86 minutes at 140° C., which simulates aging in a paving hot mix plant. Typically, an unaged binder has a value of "1" before RTFO aging, and this value increases to "2.2" following RTFO aging.

Interestingly, after the second heating process produces the RDP tire rubber/bitumen mixture with Nitrogen purging, the RTFO aging value is "1.3." The inventors' postulate that the oils from the GTR that are extracted during the heating of the tire rubber/bitumen mixture reduce the effects of aging. This unexpected result substantially improves the aging of the resulting dissolved tire rubber/bitumen mixture.

To validate that the GTR has been solubilized into the asphalt the D-Limonene Solubility test as described in ASTM D2042 is utilized. The solubility test indicates that after a cold solvent wash, less than 0.6% residue remains, thus showing that the GTR has been substantially solubilized.

Example 2

In this illustrative embodiment, an 80 mesh GTR at 20% is mixed with an asphaltene having a penetration of less than 23 dmm. More specifically, the asphaltene having a penetration of less than 23 dmm @77° F. is heated during the first heating process to between 320° F. to 420° F. An addition of GTR equal to 20% by weight of the resulting mixture was added to the heated asphalt and stirred at 4200 rpm. After 15 minutes of mixing, the mixing speed is reduced to 4000 rpm and stirring continues for an additional 15 minutes. During the stirring process, the first processed mixture of bitumen and tire rubber is subjected to a second heating process where it is heated to 605° F. The first processed bitumen/tire rubber mixture is then held at 600° F. to 605° F. for 15 minutes. After the first processed bitumen/tire rubber mixture is subjected to a second heating process where it is heated to 605° F. for 15 minutes, the stirrer is turned off and the mixture cools to between 350° F.-360° F. and samples prepared for physical property testing. A significant increase in penetration at 77° F. is observed in Table II results.

TABLE II

| Property | Before Heating | After Heating | % Change |
|---|---|---|---|
| V275F D4402 (cP) | 1174 | 1160 | 1 |
| V350F D4402 (cP) | NA | NA | NA |
| Soft. Point D38, (° F.) | 144 | 127 | −12 |
| Pen 77° F. D5 (dmm) | 22 | 77 | 250 |
| G*/sin δ @ 58 C., (Pa S) | NA | NA | NA |
| G*/sin δ @ 52 C., (Pa S) | NA | NA | NA |
| *D-Limonene Solubility using D2042 (%) | NA | 99.2 | NA |

Example 3

In a third illustrative embodiment, an asphaltene feedstock having a penetration of less than 23 dmm was mixed with an addition of GTR equal to 20% by weight of the resulting mixture having a 30 mesh size. The same method as described in Examples 1 and 2 was applied in Example 3. The results show a significant increase in penetration at 77° F. as observed in the initial experiment confirming the validity of the result with a larger GTR particle size.

TABLE III

| Property | Before Heating | After Heating | % Change |
|---|---|---|---|
| V275F D4402 (cP) | 1174 | 1347 | 15 |
| V350F D4402 (cP) | NA | NA | NA |
| Soft. Point D38, (° F.) | 144 | 139 | −3 |
| Pen 77° F. D5 (dmm) | 22 | 65 | 195 |
| G*/sin δ @ 58 C., (Pa S) | NA | NA | NA |
| G*/sin δ @ 52 C., (Pa S) | NA | NA | NA |
| *D-Limonene Solubility using D2042 (%) | NA | 99 | NA |

Modified and Enhanced RDP Embodiments

In the illustrative embodiments presented herein, an RDP compound is mixed under low shear with an asphalt feedstock and/or a process oil, and a sulfur cross-linking agent for 3-5 hours at 320° F. to 420° F. To this mixture of RDP compound, bitumen, and sulfur is then added an SBC under high shear mixing at 320° F. to 420° F. for 15 minutes to 2 hours. The resulting modified and enhanced RDP compound is then allowed to cure for 12 hours to 2 days. The illustrative embodiments show that paving binders comprising the modified and enhanced RDP compounds experience exceptional resistance to fatigue cracking, up to 60% reduced viscosity, require ~50% less SBC to obtain elastic recovery above 90%, and have a calculated non-recoverable creep compliance (Jnr) below 0.1 KPa-1 at a SBC wt. % that is ~½ that required for linear high vinyl polymers.

Example 4

In this illustrative embodiment, the RDP compound includes between 40% and 50% tire rubber by weight and an asphalt having a penetration between 17 dmm and 80 dmm @ 77° F. The RDP compound has a penetration between 40 dmm and 60 dmm, and a viscosity between 1000 cP and 4000 cP at 275° F. The process oil is a high aromatic, high flash oil that is mixed with the RDP in a ratio of ~1 part oil to 3 parts RDP compound. An exemplary process oil is Holly Frontier, designated "LPH". The sulfur added comprises 0.5% to 0.05% by weight. The SBC is a high molecular weight radial SBS having a high vinyl content, such as LCY's GP-3741 SBS. The SBS added comprises 2.5% to 3.5% by weight.

The RDP product, asphalt feedstock and/or a process oil, and a sulfur cross-linking agent were mixed with low shear for 4 hours at 380° F. To this mixture was added the SBS under high shear mixing for 60 minutes at 380° F. The resulting modified and enhanced RDP compound was allowed to cure under low shear mixing for 20 hours.

Example 5

In this illustrative embodiment, the RDP compound includes between 40% and 50% tire rubber by weight and an asphalt having a penetration between 17 dmm and 80 dmm @ 77° F. The RDP compound has a penetration between 40 dmm and 60 dmm, and a viscosity between 1000 cP and 4000 cP at 275° F. The process oil is a high aromatic, high flash oil that is mixed with the RDP compound in a ratio of ~1 part oil to 3 parts RDP compound. An exemplary process oil is Holly Frontier, designated "LPH". In one embodiment, the RDP compound comprises an addition of sulfur equal to between 0.5% to 0.05% by weight. The SBC is a high molecular weight radial SBS having a high vinyl content, such as LCY's GP-3741 SBS. The SBS added comprises 2.5% to 3.5% by weight.

The RDP compound, asphalt feedstock and/or a process oil, and a sulfur cross-linking agent were mixed with low shear for 4 hours at 380° F. To this mixture was added the SBS under high shear mixing for 30 minutes at 380° F. The resulting modified and enhanced RDP compound was allowed to cure under low shear mixing for 20 hours.

Binders

Asphalt binders cannot be represented by a single chemical formula. The American Society of Testing and Materials (ASTM) defines it as "a dark brown to black cementitious material in which the predominating constituents are bitumens which occur in nature or are obtained in petroleum processing." Asphalt binders are, however, fractionated into two subdivisions, i.e., asphaltenes and maltenes. Asphaltenes (A) are defined as that fraction of the bitumen insoluble in n-pentane. The function of the asphaltenes is to serve as a bodying agent. Maltene is the collective name for the remainder of the asphalt material left after precipitation of the asphaltenes.

Four principle bodies of maltenes have been identified and each has a specific function. These four bodies are polar compounds, first acidiffins, second acidiffins, and saturated hydrocarbons or paraffins that are cyclic or chained. Polar compounds or Nitrogen bases (N) include components of highly reactive resins, which act as peptizers for the asphaltenes. First acidiffins (A1) are components of resinous hydrocarbons which function as a solvent for the peptized asphaltenes. Second acidiffins (A2) include components of slightly unsaturated hydrocarbons that also serve as a solvent for the peptized asphaltenes. Saturated hydrocarbons or paraffins (P) are components of hydrocarbons, which function as a gelling agent for the asphalt components.

The cementing agent in an asphalt pavement, the asphalt binder (normally 4%-7% by weight) represents the component that experiences premature hardening as a result of oxidation.

Asphalt pavements, which are structurally sound, deteriorate as a result of oxidation and occasionally as a result of incorrect design or improper construction practice. Generally, the "A" and "P" asphalt components are the most stable; and the "N", "A1", and "A2" components are more subject to oxidation in descending order, respectively.

Consequently, during oxidation the "N" components convert to "A" components rapidly while the conversion process for the "A1" and "A2" components proceed at a slower rate. This process results in an increase (over time) of the "A" fraction of bitumen and a decrease (over time) in the "N", "A1", and "A2" components.

The maltenes parameter (N+A1)/(P+A2), which is the ratio of chemically more active to less reactive components present in the asphalt binder, is a measure of predictable durability. Thus, during the process of weathering or oxidation, the ratio of maltenes to asphaltenes is reduced with the result being a dry and brittle pavement.

Therefore, if a rejuvenator is to successfully resurrect an aged facility, it must be able to penetrate the pavement, and to a limited depth improve or restore the maltene to asphaltene balance. A reasonable measure of the ability of a rejuvenator to improve a pavement's durability can be had by comparing the penetration at 77° F. of the asphalt binder extracted from untreated and treated samples, and the viscosity at 140° F. of the asphalt binder extracted from untreated and treated samples.

In summary, the criteria for a rejuvenator, as disclosed herein, may contain maltene fractions of bitumen in order to improve and balance the maltene to asphaltene ratio. A test method must be employed to measure improved durability of a pavement, such as a penetration or viscosity test. Inventors acknowledge that some rejuvenators may use bio oils, such as peanut oil and vegetable oil, instead of maltenes. However, the bio oils associate with the maltene fraction, lowering the $T_g$ of the product and increasing the penetration of the product. These bio oils are more expensive, and require significant additions of binder, between 2% to 4%.

Compositions

Additional compositions of matter can be formulated with the dissolved tire rubber bitumen compound or RDP compound, which are also generally referred to as "solubilized rubber compounds."

The solubilized rubber compound presented herein utilizes a significantly shorter process time and operates at a much higher temperature than other processes. In one embodiment, the solubilized rubber compound is heated for less than 60 minutes at 600° F., which solubilizes the tire rubber and releases oil and carbon black (from the tire rubber) with minimal degradation of the bitumen (or oil) using a Nitrogen blanket or some other oxygen minimizing technology, i.e., vacuum.

The solubilized rubber compound described above may be used to make solvent based cut backs, primers, hot and emulsion based highway tack coats and membranes, non-ionic emulsions, mastics, roof coatings solvent and emulsion based, waterproofing primers, and concrete and asphalt drive way sealers, joint calking or filling compounds, rubber compounding oil, roofing with chopped fiber or partially saturated reinforcements or sub layers.

Additionally, the solubilized rubber compound may also be used with adhesives and sealants for roofing shingles and self-applied roofing and waterproofing membranes.

Furthermore, the solubilized rubber compound may be used in applications utilizing bitumen in automotive undercoating, pipe wrap, in addition to wire and cable wrap benefit from the carbon black released from the tire rubber along with the oils that improve both weathering and adhesion of these materials to a wide variety of substrates.

Further still, chemical treatment of the solubilized rubber compound can also be performed using various acids and catalyst common to the roofing and paving industries. In paving, it is common to add super polyphosphoric acid to improve flow properties of the bitumen and likewise enhances the solubilized rubber compound.

Oxidized bitumen is routinely prepared using a range of acids and additives to catalyze the oxidation process by reducing the air blowing time and improve the desired properties of penetration, softening point, and viscosity. This solubilized rubber compound can be used to air blow with or without catalyst to make a roof coating that yields improved weathering from the carbon black and oils released from the tire rubber.

Likewise, post blending of the solubilized rubber compound into oxidized roofing coating to improve penetration and viscosity yields improved coating weathering performance.

The solubilized rubber compounds presented above may be employed for asphalt pavement preservation, including rejuvenator emulsions, asphalt emulsion fog seals, a variety of surface treatments (including slurry and micro surfacing technologies), and emerging asphalt thin overlay technologies.

Table IV displays the various embodiments disclosed herein:

TABLE IV

| Embodiment | Process Elements |
| --- | --- |
| FIG. 1 method for dissolving scrap tire rubber | 1%-70% tire rubber and asphalt feedstock heated to 525° F.-700° F. for 5 min-60 min |
| Modified method 1 for dissolving tires | 50% or more tire rubber and asphalt feedstock heated to 600° F.-650° F. for 60 min-120 min |
| Modified method 2 for dissolving tires | 50% or more tire rubber and oil heated to 600° F.-650° F. for 60 min-120 min |
| System for dissolving rubber | Rubber and bitumen mixed in reaction vessel at 525° F.-700° F. under non-oxidizing gas |
| Modified system for dissolving rubber | Rubber and bitumen mixed in reaction vessel at 525° F.-700° F. under non-oxidizing gas; sulfur added to the mixture |
| RDP Example 1 | 10% GTR stirred into bitumen at 320° F.-420° F. and mixed for 30 min, scrap tire rubber and bitumen heated to 605° F. for 15 min, and cooled to between 350° F.-360° F. |
| RDP Example 2 | 20% 80 mesh GTR stirred into bitumen at 320° F.-420° F. and mixed for 30 min, GTR and bitumen heated to 605° F. for 15 min, and cooled to between 350° F.-360° F. |
| RDP Example 3 | 20% 30 mesh GTR stirred into bitumen at 320° F.-420° F. and mixed for 30 min, GTR and bitumen heated to 605° F. for 15 min, and cooled to between 350° F.-360° F. |
| Modified and Enhanced Example 4 | RDP compound, asphalt feedstock, and sulfur low shear mixed at 380° F. for 4 hours. SBS added and mixed under high shear for 60 minutes at 380° F. |

TABLE IV-continued

| Embodiment | Process Elements |
|---|---|
| Modified and Enhanced Example 5 | RDP compound, asphalt feedstock, and sulfur low shear mixed at 380° F. for 4 hours. SBS added and mixed under high shear for 30 minutes at 380° F. |

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A method for generating a modified dissolved tire rubber bitumen compound comprising:
   receiving bitumen compound;
   heating the bitumen compound to between 320° F. to 420° F.;
   adding a tire rubber to the bitumen compound;
   mixing the bitumen compound and the tire rubber for 5 minutes to 360 minutes, wherein the bitumen compound and the tire rubber are heated submitted to a second heating of between 525° F. to 700° F. during mixing;
   adding sulfur to the mixture of the tire rubber and the bitumen compound; and
   cooling the resulting modified dissolved tire rubber bitumen compound.

2. The method of claim 1 further comprising applying a neutral gas when generating the modified dissolved tire rubber bitumen compound.

3. The method of claim 1 further comprising cooling the modified dissolved tire rubber bitumen compound to 500° F. to 350° F.

4. The method of claim 1 further including separating the modified dissolved tire rubber bitumen compound from a metallic alloy.

5. The method of claim 1 wherein the bitumen compound has a penetration of 0 dmm to 200 dmm.

6. The method of claim 1 wherein the bitumen compound is received by a reaction vessel, the tire rubber is added to the bitumen compound in the reaction vessel, and the reaction vessel is heated to between 320° F. to 420° F. to generate a first processed tire rubber and bitumen mixture; and
   the modified dissolved tire rubber bitumen compound is generated in the reaction vessel by heating the first processed tire rubber and bitumen mixture to 525° F. to 700° F.

7. The method of claim 1 further comprising cross-linking one of the tire rubber, the bitumen compound, the modified dissolved tire rubber bitumen compound, and any combination thereof with the added sulfur.

8. The method of claim 1 wherein there is little or no oxidation of the bitumen compound, the tire rubber, and the modified dissolved tire rubber bitumen compound.

9. The method of claim 1 further comprising:
   generating volatile organic compounds ("VOCs"); and
   cross-linking at least some of the VOCs with the added sulfur.

10. The method of claim 1 further comprising applying a vacuum when generating the modified dissolved tire rubber bitumen compound.

* * * * *